(12) United States Patent
Oh et al.

(10) Patent No.: US 8,670,438 B2
(45) Date of Patent: Mar. 11, 2014

(54) COMMUNICATION SYSTEM, BASE STATION APPARATUS, AND MOBILE STATION APPARATUS

(75) Inventors: Wahoh Oh, Osaka (JP); Katsuyuki Machino, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 618 days.

(21) Appl. No.: 12/935,294

(22) PCT Filed: Mar. 30, 2009

(86) PCT No.: PCT/JP2009/056486
§ 371 (c)(1),
(2), (4) Date: Oct. 26, 2010

(87) PCT Pub. No.: WO2009/123105
PCT Pub. Date: Oct. 8, 2009

(65) Prior Publication Data
US 2011/0034177 A1     Feb. 10, 2011

(30) Foreign Application Priority Data

Mar. 31, 2008   (JP) ................................ 2008-094352

(51) Int. Cl.
*H04J 3/06*     (2006.01)
(52) U.S. Cl.
USPC ........... 370/350; 370/345; 370/343; 370/503; 455/502; 455/501; 455/500
(58) Field of Classification Search
None
See application file for complete search history.

(56) References Cited

U.S. PATENT DOCUMENTS

| 7,502,596 | B2 | 3/2009 | Takao et al. |
| 8,040,866 | B2 | 10/2011 | Hokao |
| 2002/0164986 | A1 | 11/2002 | Briand et al. |
| 2002/0173277 | A1 | 11/2002 | Takao et al. |

(Continued)

FOREIGN PATENT DOCUMENTS

| JP | 11-266262 A | 9/1999 |
| JP | 2002-521988 A | 7/2002 |

(Continued)

OTHER PUBLICATIONS

3GPP, Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.3.0, Dec. 2007.

(Continued)

*Primary Examiner* — Anez Ebrahim
(74) *Attorney, Agent, or Firm* — Birch, Stewart, Kolasch & Birch, LLP

(57) ABSTRACT

Utilizing a frequency-bandwidth limited IMT frequency band of 3 GHz, requirements of IMT-Advanced; that is, 100 Mbps for high speed movement and 1 Gbps for low speed movement in the downlink are satisfied. A communication system performs radio communication between a base station apparatus 40a and a mobile station apparatus 50 using a plurality of frequency layers having frequency bands different from each other, wherein the base station apparatus 40a assigns a downlink cell common control channel and a downlink cell common traffic channel to a low-frequency layer, and assigns a downlink cell dedicated control channel and a downlink cell dedicated traffic channel to a low-frequency layer and/or a high-frequency layer according to a downlink channel status and a communication requirement of the mobile station apparatus 50.

10 Claims, 15 Drawing Sheets

(56) References Cited

U.S. PATENT DOCUMENTS

| | | | |
|---|---|---|---|
| 2004/0121780 A1* | 6/2004 | Nasshan | 455/455 |
| 2008/0025236 A1 | 1/2008 | Jones | |
| 2009/0010213 A1* | 1/2009 | Yamada et al. | 370/329 |
| 2009/0052403 A1 | 2/2009 | Hokao | |
| 2009/0163208 A1* | 6/2009 | Rao | 455/436 |
| 2011/0038434 A1* | 2/2011 | Sawahashi et al. | 375/260 |

FOREIGN PATENT DOCUMENTS

| | | |
|---|---|---|
| JP | 2003-37869 A | 2/2003 |
| JP | 3802372 B2 | 5/2006 |
| JP | 2007-505583 A | 3/2007 |
| WO | WO 00/07399 A1 | 2/2000 |
| WO | WO 2006/047571 A1 | 5/2006 |
| WO | WO 2006/100994 A1 | 9/2006 |

OTHER PUBLICATIONS

3GPP, Technical Specification Group Radio Access Network; Evolved Universal Terrestrial Radio Access (E-UTRA); Physical Channels and Modulation (Release 8), 3GPP TS 36.211 V8.1.0, Nov. 2007.

3GPP, Technical Specification Group Radio Access Network; Physical channels and mapping of transport channels onto physical channels (FDD) (Release 7), 3GPP TS 25.211 V7.0.0, Mar. 2006.

* cited by examiner

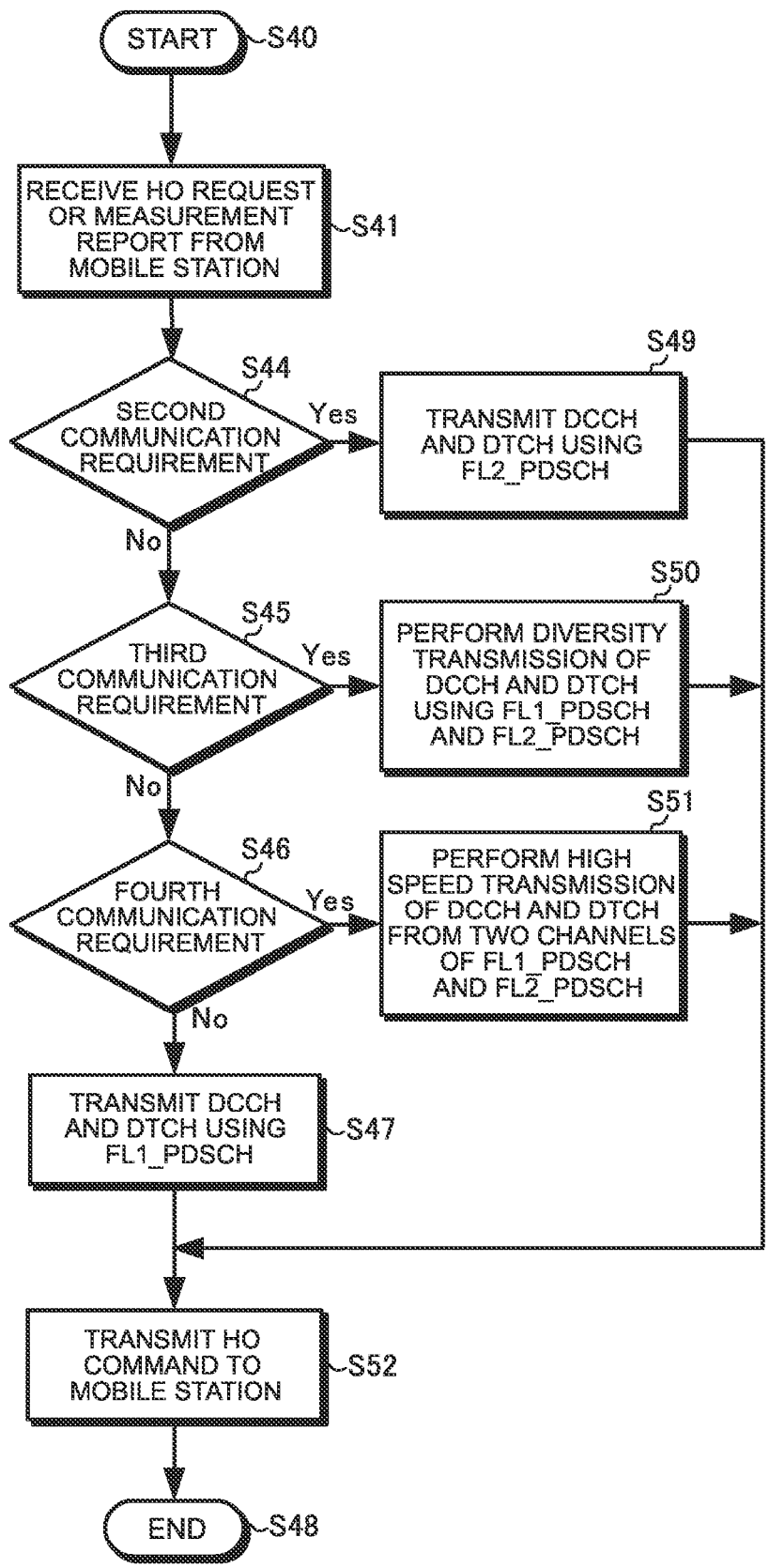

COMMUNICATION SYSTEM, BASE STATION APPARATUS, AND MOBILE STATION APPARATUS

TECHNICAL FIELD

The present invention relates to a technology of performing radio communication between a base station apparatus and a mobile station apparatus using a plurality of frequency layers having frequency bands different from each other.

BACKGROUND ART

In 3GPP (3rd Generation Partnership Project), standardization of the third generation (3G) UTRA (Universal Terrestrial Radio Access) as the cellular mobile communication system is underway, and its services are launched in sequence (e.g., non-patent literature 1). Standard formulation of the evolution of third generation radio access, EUTRA (Evolved Universal Terrestrial Radio Access) is also in progress (e.g., non-patent literature 1). Furthermore, IMT-Advanced is under consideration as the fourth generation (4G) radio access.

IMT-Advanced assumes realization of 100 Mbps for high speed movement and even 1 Gbps for high speed movement, with its available frequency band determined in WRC07 (World Radio Conference 07) held by ITU-R (International Telecommunication Union Radio communications Sector) in the autumn of 2007. Standard formulation works subsequently became active through 2008 to 2009, and its services are expected to be launched in 2010 or later.

ITU-R has determined, as new frequency band for the 3G and 4G mobile communication system (IMT: International Mobile Telecommunication) to be used globally, a 200 MHz width of 3.4 to 3.6 GHz, a 100 MHz width of 2.3 to 2.4 GHz, a 108 MHz width of 698 to 806 MHz, and a 20 MHz width of 450 to 470 MHz, specifically. Each country will allocate actual frequencies for IMT from the above, according to circumstances in its own country. In the future, each country will deploy IMT-Advanced services utilizing IMT-2000 Plan Band assigned to 3G and IMT Band newly assigned to 3G and 4G. However, considering provision of IMT-Advanced services from plural carriers to a single area, it is difficult for a single carrier to secure a continuous 100 MHz band for IMT-Advanced. Additionally, although it is easy to secure a wide band in a high-frequency band (e.g., 3 GHz or higher), there is difficulty in securing a wide continuous cell cover area and supporting high speed movement because of significant radio propagation attenuation in wide band/high frequencies.

Furthermore, existing carriers providing second generation (2G) and third generation (3G) mobile communication services may consider that it is desirable to provide IMT-Advanced services based on existing base station locations, and therefore they may have a negative attitude toward introducing new technology with regard to base station placement or new facility addition such as a repeater station, a relay station, or DWCS (Distributed Wireless Communication Systems).

Before considering INRI (IMT-Advanced New Radio Interface(s)), it is necessary to deliberate the method, system configuration, or radio channel configuration for frequency bands, taking into account the IMT Band for which securing a 100 MHz band is difficult.

There have been proposed, as conventional technologies, a method which supports non-symmetric amounts of communication by switching between a plurality of wireless multiple-access methods in a plurality of frequency bands to effectively utilize frequencies (e.g., patent literature 1), a method which detects reserved capacity of FDD (Frequency Division Duplex) and assigns it to a TDD (Time Division Duplex) mobile station facility (e.g., patent literature 2), or a method which configures a system using a plurality of frequency bands to increase the downlink data transmission speed (e.g., patent literature 3).

Particularly, as the method which configures a system using a plurality of frequency bands to increase the downlink data transmission speed (e.g., patent literature 3), for a mobile communication system including a main frequency band having a single frequency bandwidth BW1 and a sub-frequency band having a plurality of frequency bandwidths BW2 and BW3, a method is proposed, which performs, as shown in FIG. 13, communication via one frequency bandwidth (e.g., BW2: Band Width 2) of the sub-frequency band in addition to the main frequency band, according to the inherent ability of the mobile station apparatus, i.e., category of the mobile station apparatus (UE categories), and it is proposed that at least one frequency bandwidth (e.g., BW3) in the sub-frequency band supports the downlink only.

(A) Explanation of a Cell Common Channel and a Cell Dedicated Channel

Downlink radio channels include radio common channels required to cover the entire cell area and assure a predetermined reception quality in a mobile station apparatus at the cell edge. These radio common channels, which employ, for example, a low-rate modulation system such as BPSK: Binary Phase Shift Keying or QPSK: Quadrature Phase Shift Keying, an encoding system with high redundancy, and radio transmission system that is highly-resistant to interference such as iterative transmission along the time/frequency axis, or a spread spectrum system with a high spreading factor, assure predetermined reception quality down to the cell edge. Generally, because the radio resource to be used by each radio channel is limited, the radio common channel has a low data transmission speed in order to assure a predetermined reception quality.

As common transmission data in a mobile communication system, control data of a mobile communication system, such as identical synchronization data, broadcast data or common control data, i.e., a radio common control channel, and broadcast data for providing services to a plurality of mobile station apparatuses (e.g., MBMS data described below), i.e., a radio common traffic channel, are transmitted to a plurality of mobile station apparatuses, for example. Here, a radio common control channel and a radio common traffic channel required to cover the entire cell area and assure a predetermined reception quality down to a mobile station apparatus at the cell edge are respectively referred to as DCCCCH (Downlink Cell Common Control Channel) and DCCTCH (Downlink Cell Common Traffic Channel).

Downlink radio channels, on the other hand, include radio dedicated channels required to assure a predetermined reception quality down to a mobile station apparatus moving within a cell area without having to cover the entire cell area. These radio dedicated channels set the modulation system according to the distance between the mobile station apparatus and the base station apparatus, radio propagation loss, variation of radio propagation signal power, or the like. If, for example, a radio propagation loss between the mobile station apparatus and the base station apparatus is large, a low-rate modulation system, such as BPSK or QPSK, an encoding system with high redundancy, and a radio transmission system that is highly-resistant to interference such as iterative transmission along the time/frequency axis, a spread spectrum system with a high spreading factor, or high transmission power are used, whereas a high-rate modulation system such as 16 QAM (16 Quadrature Amplitude Modulation) or 64 QAM, an encoding system with low redundancy, and wireless transmission methods having a high data transmission speed with a low transmission power such as no iterative transmission along the time/frequency axis, a spread spectrum system with a low spreading factor, and low transmission power are used if radio propagation loss between the mobile station apparatus and the base station apparatus is small, which assures a required reception quality of the mobile station apparatus.

As individual transmission data in a mobile communication system, there are, for example, user data to individual mobile station apparatuses, i.e., a radio dedicated traffic channel, and radio resource allocation information data of user data and user data demodulation information data such as degree of modulation/encoding system, i.e., a radio dedicated control channel. Here, a radio dedicated channel and a radio dedicated traffic channel required to assure a predetermined reception quality down to a mobile station apparatus moving within a cell area without having to cover the entire cell area, are respectively referred to as DCDCCH (Downlink Cell Dedicated Control Channel) and DCDTCH (Downlink Cell Dedicated Traffic Channel).

(B) Explanation of Downlink Radio Frame Configuration of EUTRA (Non-Patent Literature 2)

EUTRA technology specification document of 3GPP describes a downlink radio access technology of EUTRA. FIG. 6 illustrates a radio frame configuration of the downlink of EUTRA. With regard to assignment of downlink radio channels, a method is employed which multiplexes time and frequencies with TDM (Time Division Multiplexing), FDM (Frequency Division Multiplexing), or a combination of TDM and FDM, using resources of the frequency axis (in units of subcarrier) and the time axis (in units of OFDM symbol) of OFDM (Orthogonal Frequency Division Multiplexing) signals, as shown in FIG. 6. The downlink radio frame is composed of a frequency bandwidth Bch which is a collection of a plurality of subcarriers along the frequency axis direction and a plurality of two-dimensional PRBs (Physical Resource Block) by the SF (Sub-frame) of the time axis. For example, on the frequency axis, the entire downlink spectrum (system frequency bandwidth BW specific to the base station) is set to 20 MHz, the frequency bandwidth Bch of PRB is set to 180 kHz, the subframe SF is set to 0.5 ms, the subcarrier frequency bandwidth Bsc is set to 15 kHz, and a single radio frame is set to 10 ms. Twelve subcarriers and one subframe compose a radio physical resource block PRB. Ts denotes the OFDM symbol length. Additionally, a known RS (Reference Signal) or a PS (Pilot Signal) is inserted in the radio frame for data demodulation and measurement of downlink radio channel condition.

(C) Explanation of Radio Channel Configuration in EUTRA (Non-Patent Literature 3)

EUTRA technology specification document of 3GPP describes a radio channel configuration of EUTRA. As shown in FIG. 9, the uplink uses the natural frequency bandwidth BW of the base station apparatus and the following radio physical channels are mapped. PRACH (Physical Random Access Channel) transmits RACH (Random Access Channel) of the transport channels with a random access preamble. RACH is used at the time of initial access, handover, or when uplink or downlink communication data is generated. RACHs can be classified into the collision type in which RACHs from respective mobile station apparatuses collide on the radio resource and the non-collision type in which RACHs from respective mobile station apparatuses can be separated on the radio resource.

PUCCH (Physical Uplink Control Channel) transmits control information from the mobile station apparatus. With PUCCH, the mobile station apparatus is used, according to the downlink reception conditions, for HARQ (Hybrid Automatic Repeat Request), an affirmative response ACK (Acknowledgement) or a negative response NAK (Negative Acknowledgement), transmission of information bits, transmission of SR (Scheduling Request) information bits requesting allocation of uplink radio resource to the base station apparatus, transmission of information bits of downlink CQI (Channel Quality Indicator) estimated by the mobile station apparatus, transmission of the number of data streams NLR (Number of Layers Rank, which depends on the number of transmission antennas) and transmission PCI (Pre-coding Codebook Index) information bits of a base station apparatus selected according to the reception conditions of the mobile station apparatus, or transmission of control information bits such as the result of measurement of the mobile station apparatus. PUSCH (Physical Uplink Shared Channel) transmits UL-SCH (Uplink Shared Channel) of the transport channel.

CCCH (Common Control Channel), DCCH (Dedicated Control Channel), and DTCH (Dedicated Traffic Channel) of logical channels are included. CCCH, which transmits control signals between a plurality of mobile station apparatuses and a mobile communication network, is used in a state other than the RRC_CONNECTED Mode. DCCH, which transmits control signals between individual mobile station apparatuses and the mobile communication network, is used in the state of the RRC_CONNECTED Mode. DTCH, which is a one-to-one channel between the mobile communication network and the individual mobile station apparatuses, is used for transmitting uplink user data. Additionally, a part of the control information bits can be transmitted using a part of the radio resource of PUCCH, instead of PUCCH.

The downlink uses the natural frequency bandwidth BW of the base station apparatus. As shown in FIGS. 6 and 9, the radio physical channel described below is mapped. SCH (Synchronization Channel) is inserted in the downlink radio frame. SCH is used for initial synchronization of OFDM reception signals, cell selection, and cell search for reselection or cell handover during communication, for example. SCH includes carrier frequency offset synchronization, OFDM symbol timing synchronization, radio frame timing synchronization, related information of specific CPID (Cell Physical Identification), related information of the cell physical configuration, or the like. SCH is composed of two sub-channels, a P-SCH (Primary SCH) and an S-SCH (Secondary SCH). The P-SCH and the S-SCH are downlink cell common control channels DCCCCH.

PBCH (Physical Broadcast Channel) transmits broadcast information such as system information or cell information. PBCH is a downlink cell common control channel DCCCCH. PDSCH (Physical Downlink Shared Channel) transmits DL-SCH (Downlink Shared Channel) of the transport channel and PCH (Paging Channel). DL-SCH includes BCCH (Broadcast Control Channel) of the logical channel, CCCH (Common Control Channel), DCCH (Dedicated Control Channel), DTCH (Dedicated Traffic Channel), MCCH (Multicast Control Channel), and MTCH (MBMS Traffic Channel) of MBMS (Multimedia Broadcast Multicast Service).

The paging channel PCH includes PCCH (Paging Control Channel) of the logical channel. As transmission methods of MBMS, there are a method in which only one base station performs transmission and a method in which a plurality of base stations synchronizing with time and frequency perform transmission simultaneously. The former is referred to as SCPTM (Single-Cell Point-to-Multipoint) and the latter is referred to as MBSFN (Multimedia Broadcast multicast service Single Frequency Network). As for MBMS transmission signals of a MBSFN cell that provides MBSFN service, identical MBMS signals are simultaneously transmitted by a plurality of base station apparatuses so that MBMS reception signals of a plurality of MBSFN cells can be synthesized for the mobile station apparatus. MCCH and MTCH are downlink cell common traffic channels DCCTCH for the case of an MBSFN cell. BCCH, CCCH and PCCH are downlink cell common control channels DCCCCH. DTCH is a downlink cell dedicated traffic channel DCDTCH. DCCH is a downlink cell dedicated control channel DCDCCH.

PDCCH (Physical Downlink Control Channel) transmits radio resource allocation information bits of DL-SCH and PCH of the transport channel included in PDSCH, information bits of HARQ associated with DL-SCH, and Uplink scheduling grant signaling. PDCCH is a downlink cell dedicated control channel DCDCCH.

PHICH (Physical Hybrid ARQ Indicator Channel) transmits Hybrid ARQ ACK/NAKs information bits corresponding to uplink PUSCH. PHICH is a downlink cell dedicated control channel DCDCCH. PCFICH (Physical Control Format Indicator Channel) transmits information bits of the number of OFDM symbols to be used by the physical downlink control channel PDCCH. PCFICH is a downlink cell common control channel DCCCCH.

PMCH (Physical Multicast Channel) transmits a multicast transport channel (MCH: Multicast Channel). Similarly to DL-SCH, to MCH there can be assigned MCCH and MTCH, which are used for MBMS.

Although there are descriptions of the above-mentioned MBSFN and SCPTM with regard to MCCH and MTCH, as shown in FIG. 9, here we temporarily define MCCH and MTCH as a downlink cell common traffic channel DCCTCH in case of MBSFN cell and define them as a downlink cell dedicated traffic channel DCDTCH in case of SCPTM, because their specification is under consideration. Hereinafter, the specification will be adhered to.

Patent Literature 1: Japanese Patent No. 3802372
Patent Literature 2: Translated Japanese Publication of Patent Application No. 2002-521988
Patent Literature 3: Translated Japanese Publication of Patent Application No. 2007-505583
Non-patent Literature 1: 3GPP TS 25.211,V7.0.0 (2006-03), Physical channels and mapping of transport channels onto physical channels.
http://www.3gpp.org/ftp/Specs/html-info/25-series.htm
Non-patent Literature 2: 3GPP TS 36.211,V8.1.0 (2007-12), Physical Channels and Modulation.
http://www.3gpp.org/ftp/Specs/html-info/36211.htm
Non-patent Literature 3: 3GPP TS 36.300,V8.3.0 (2007-12), Overall description;Stage2.
http://www.3gpp.org/ftp/Specs/html-info/36300.htm

DISCLOSURE OF THE INVENTION

Problems to be Solved by the Invention

However, conventional technologies mentioned above do not present any specific radio channel configuration for satisfying the conditions required in the next generation mobile communication system such as 100 Mbps for high speed movement and 1 Gbps for low speed movement, 10 ms IT (Interruption Time) of IFH (Inter-Frequency Handover), or any method of transmitting and receiving data at base station apparatuses and mobile station apparatuses. Additionally, a high data transmission speed and a large cell cover area are required for the next generation mobile communication system.

For downlink radio channels such as those mentioned above, there are a downlink cell common control channel DCCCCH and a downlink cell common traffic channel DCCTCH which are required to cover the entire cell area and assure a predetermined reception quality down to a mobile station apparatus at the cell edge. Since they have to cover the entire cell area, frequency use efficiency of DCCCCH and DCCTCH is low. In a mobile communication system having a plurality of frequency bands, the downlink cell common control channel DCCCCH and downlink cell common traffic channel DCCTCH are not suitable to be transmitted in a high-frequency band because there are, in the high-frequency band, outstanding rectilinear radio propagation property, large radio propagation loss, large building entry loss, and further, large Doppler spread relative to the movement speed.

The present invention has been made in view of the above circumstances, and proposes, as a method of assigning radio channels in a mobile communication system having a plurality of frequency bands, a method of preliminarily assigning all downlink cell common control channels DCCCCH and downlink cell common traffic channels DCCTCH constituting the mobile communication system to a low-frequency band, and adaptively assigning a downlink cell dedicated control channel DCDCCH and a downlink cell dedicated traffic channel DCDTCH to a low-frequency layer and/or a high-frequency layer according to a radio propagation status and a communication requirement.

In other words, it is an object of the present invention to provide a communication system, a base station apparatus, and a mobile station apparatus which can satisfy requirements for IMT-Advanced, that is, 100 Mbps for high speed movement and 1 Gbps for low speed movement in the downlink, utilizing a frequency-bandwidth limited IMT frequency band of 3 GHz.

(1) In order to achieve the above object, the present invention takes the following measures. That is, a communication system of the present invention is a communication system which performs radio communication between a base station apparatus and a mobile station apparatus using a plurality of frequency layers having frequency bands different from each other, wherein the base station apparatus assigns a downlink cell common control channel and a downlink cell common traffic channel to a low-frequency layer, and assigns a downlink cell dedicated control channel and a downlink cell dedicated traffic channel to a low-frequency layer and/or a high-frequency layer according to a downlink channel status and a communication requirement from the mobile station apparatus.

Since the downlink cell common control channel DCCCCH and downlink cell common traffic channel DCCTCH are assigned to a low-frequency layer in this manner, it becomes possible to improve reliability and stability of the entire system, and improve frequency use efficiency of the entire system. Additionally, since the downlink cell dedicated control channel DCDCCH and downlink cell dedicated traffic channel DCDTCH are assigned to a low-frequency layer and/or a high-frequency layer according to the downlink channel status and the communication requirement of the mobile station apparatus, it becomes possible to provide an ultra high data transmission speed to a mobile station apparatus moving at low speed, and provide the maximum data transmission speed in the system to a mobile station apparatus moving at high speed, and to flexibly respond to various communication requirements, thus making it possible to provide a next generation mobile communication system which can satisfy requirements of IMT-Advanced, that is, 100 Mbps for high speed movement and 1 Gbps for low speed movement in the downlink, utilizing frequency-bandwidth limited IMT frequency band of 3 GHz.

(2) Additionally, in the communication system of the present invention, the base station apparatus receives a numerical value indicating the channel status of the mobile station apparatus, compares the numerical value indicating the channel status with a predetermined threshold value, and, if the numerical value indicating the channel status is smaller than the threshold value, assigns a downlink cell dedicated control channel and a downlink cell dedicated traffic channel to a low-frequency layer.

Since the downlink cell dedicated control channel DCDCCH and downlink cell dedicated traffic channel DCDTCH are assigned to a low-frequency layer in this manner if the numerical value indicating the channel status is smaller than the threshold value, it is possible to provide the maximum data transmission speed in the system to the mobile station apparatus moving at high speed while maintaining the continuity of communication, for example, and to flexibly respond to various communication requirements.

(3) Additionally, in the communication system of the present invention, the base station apparatus receives a numerical value indicating the channel status of the mobile station apparatus, compares the numerical value indicating the channel status with a predetermined threshold value, and, if the numerical value indicating the channel status is larger than the threshold value, determines the communication requirement of the mobile station apparatus, and assigns a downlink cell dedicated control channel and a downlink cell dedicated traffic channel to a high-frequency layer if the communication requirement of the mobile station apparatus is a second communication requirement, and assigns a downlink cell dedicated control channel and a downlink cell dedicated traffic channel to a low-frequency layer and a high-frequency layer if the communication requirement of the mobile station apparatus is a third communication requirement or a fourth communication requirement.

As thus described, if the numerical value indicating the channel status is larger than the threshold value, communication requirements of the mobile station apparatus are determined and the downlink cell dedicated control channel DCDCCH and downlink cell dedicated traffic channel DCDTCH are assigned to a high-frequency layer if the communication requirement of the mobile station apparatus is a second communication requirement, and the downlink cell dedicated control channel DCDCCH and downlink cell dedicated traffic channel DCDTCH are assigned to a low-frequency layer and a high-frequency layer if the communication requirement from the mobile station apparatus is a third communication requirement or a fourth communication requirement. Consequently, it becomes possible to flexibly respond to various communication requirements, and to improve reliability and stability of the entire system, and improve frequency use efficiency of the entire system.

(4) Additionally, in the communication system of the present invention, the base station apparatus determines the communication requirement of the mobile station apparatus, and assigns a downlink cell dedicated control channel and a downlink cell dedicated traffic channel to a low-frequency layer if the communication requirement of the mobile station apparatus is a first communication requirement, assigns a downlink cell dedicated control channel and a downlink cell dedicated traffic channel to a high-frequency layer if the communication requirement of the mobile station apparatus is a second communication requirement, and assigns a downlink cell dedicated control channel and a downlink cell dedicated traffic channel to a low-frequency layer and a high-frequency layer if the communication requirement of the mobile station apparatus is a third communication requirement or a fourth communication requirement.

As thus described, since the downlink cell dedicated control channel DCDCCH and downlink cell dedicated traffic channel DCDTCH are assigned to a high-frequency layer if the communication requirement is a second communication requirement, and the downlink cell dedicated control channel DCDCCH and downlink cell dedicated traffic channel DCDTCH are assigned to a low-frequency layer and a high-frequency layer if the communication requirement of the mobile station apparatus is a third communication requirement or a fourth communication requirement, it becomes possible to flexibly respond to various communication requirements, and to improve reliability and stability of the entire system, and improve frequency use efficiency of the entire system.

(5) Additionally, the base station apparatus of the present invention is a base station apparatus which performs radio communication with a mobile station apparatus using a plurality of frequency layers having frequency bands different from each other, the base station apparatus comprising: a determination unit which determines a downlink channel status of the mobile station apparatus and a communication requirement of the mobile station apparatus; and a mapping unit which assigns a downlink cell common control channel and a downlink cell common traffic channel to a low-frequency layer and assigns a downlink cell dedicated control channel and a downlink cell dedicated traffic channel to a low-frequency layer and/or a high-frequency layer based on a downlink channel status of a mobile station apparatus and a communication requirement of the mobile station apparatus as a result of the determination.

As thus described, since the downlink cell common control channel DCCCCH and downlink cell common traffic channel DCCTCH are assigned to a low-frequency layer, it becomes possible to improve reliability and stability of the entire system, and to improve frequency use efficiency of the entire system. Additionally, since the downlink cell dedicated control channel DCDCCH and downlink cell dedicated traffic channel DCDTCH are assigned to a low-frequency layer and/or a high-frequency layer according to the downlink channel status and the communication requirement of the mobile station apparatus, it is possible to provide a next generation mobile communication system which can provide an ultra high data transmission speed to a mobile station apparatus moving at low speed, and the maximum data transmission speed in the system to a mobile station apparatus moving at high speed and flexibly respond to various communication requirements, and to satisfy requirements of IMT-Advanced, that is, 100 Mbps for high speed movement and 1 Gbps for low speed movement in the downlink, utilizing frequency-bandwidth limited IMT frequency band of 3 GHz.

(6) Additionally, in the base station apparatus of the present invention, the determination unit compares a numerical value indicating a channel status of the mobile station apparatus with a predetermined threshold value, and the mapping unit assigns a downlink cell dedicated control channel and a downlink cell dedicated traffic channel to a low-frequency layer, if, as a result of the comparison, the numerical value indicating the channel status is smaller than the threshold value.

As thus described, since the downlink cell dedicated control channel DCDCCH and downlink cell dedicated traffic channel DCDTCH are assigned to a low-frequency layer if the numerical value indicating the channel status is smaller than the threshold value, it is possible to provide the maximum data transmission speed in the system to the mobile station apparatus moving at high speed while maintaining the continuity of communication, for example, and to flexibly respond to various communication requirements.

(7) Additionally, in the base station apparatus of the present invention, the determination unit compares a numerical value indicating a channel status of the mobile station apparatus with a predetermined threshold value and if, as a result of the comparison, the numerical value indicating the channel status is larger than the threshold value, determines the communication requirement of the mobile station apparatus; and the mapping unit assigns a downlink cell dedicated control channel and a downlink cell dedicated traffic channel to a high-frequency layer, if, as a result of the determination, the communication requirement of the mobile station apparatus is a second communication requirement, and assigns a downlink cell dedicated control channel and a downlink cell dedicated traffic channel to a low-frequency layer and a high-frequency layer if the communication requirement of the mobile station apparatus is a third communication requirement or a fourth communication requirement.

As thus described, since, if the numerical value indicating the channel status is larger than the threshold value, the communication requirement of the mobile station apparatus is determined, and the downlink cell dedicated control channel DCDCCH and downlink cell dedicated traffic channel DCDTCH are assigned to a high-frequency layer if the communication requirement of the mobile station apparatus is a second communication requirement, and the downlink cell dedicated control channel DCDCCH and downlink cell dedicated traffic channel DCDTCH are assigned to a low-frequency layer and a high-frequency layer if the communication requirement from the mobile station apparatus is a third communication requirement or a fourth communication requirement, it becomes possible to flexibly respond to various communication requirements, and to improve reliability and stability of the entire system, and improve frequency use efficiency of the entire system.

(8) Additionally, in the base station apparatus of the present invention, the determination unit determines the communication requirement of the mobile station apparatus, and the mapping unit assigns a downlink cell dedicated control channel and a downlink cell dedicated traffic channel to a low-frequency layer if, as a result of the determination, the communication requirement of the mobile station apparatus is a first communication requirement, assigns a downlink cell dedicated control channel and a downlink cell dedicated traffic channel to a high-frequency layer if the communication requirement of the mobile station apparatus is a second communication requirement, and assigns a downlink cell dedicated control channel and a downlink cell dedicated traffic channel to a low-frequency layer and a high-frequency layer if the communication requirement of the mobile station apparatus is a third communication requirement or a fourth communication requirement.

As thus described, since the downlink cell dedicated control channel DCDCCH and the downlink cell dedicated traffic channel DCDTCH are assigned to a high-frequency layer if the communication requirement is a second communication requirement, and the downlink cell dedicated control channel DCDCCH and downlink cell dedicated traffic channel DCDTCH are assigned to a low-frequency layer and a high-frequency layer if the communication requirement of the mobile station apparatus is a third communication requirement or a fourth communication requirement, it becomes possible to flexibly respond to various communication requirements, and to improve reliability and stability of the entire system, and improve frequency use efficiency of the entire system.

(9) Additionally, the mobile station apparatus of the present invention is a mobile station apparatus which performs radio communication with a base station apparatus using a plurality of frequency layers having frequency bands different from each other, wherein the mobile station apparatus receives from the base station apparatus a downlink cell common control channel and a downlink cell common traffic channel assigned to a low-frequency layer, and receives from the base station apparatus a downlink cell dedicated control channel and a downlink cell dedicated traffic channel assigned to a low-frequency layer and/or a high-frequency layer according to a downlink channel status and a communication requirement.

As thus described, since the downlink cell common control channel DCCCCH and downlink cell common traffic channel DCCTCH are assigned to a low-frequency layer, it becomes possible to improve reliability and stability of the entire system and to improve frequency use efficiency of the entire system. Additionally, since the downlink cell dedicated control channel DCDCCH and downlink cell dedicated traffic channel DCDTCH are assigned to a low-frequency layer and/or a high-frequency layer according to the downlink channel status and the communication requirement of the mobile station apparatus, it is possible to provide a next generation mobile communication system which can provide an ultra high data transmission speed to a mobile station apparatus moving at low speed, and the maximum data transmission speed in the system to a mobile station apparatus moving at high speed, and flexibly respond to various communication requirements, and to satisfy requirements of IMT-Advanced, that is, 100 Mbps for high speed movement and 1 Gbps for low speed movement in the downlink, utilizing a frequency-bandwidth limited IMT frequency band of 3 GHz.

Effects of the Invention

According to the present invention, since a downlink cell common control channel DCCCCH and downlink cell common traffic channel DCCTCH are assigned to a low-frequency layer, it becomes possible to improve reliability and stability of the entire system and to improve frequency use efficiency of the entire system. Additionally, since a downlink cell dedicated control channel DCDCCH and downlink cell dedicated traffic channel DCDTCH are assigned to a low-frequency layer and/or a high-frequency layer according to a downlink channel status and a communication requirement of the mobile station apparatus, it is possible to provide a next generation mobile communication system which can provide an ultra high data transmission speed to a mobile station apparatus moving at low speed, and the maximum data transmission speed in the system to a mobile station apparatus moving at high speed and flexibly respond to various communication requirements, and to satisfy requirements of IMT-Advanced, that is, 100 Mbps for high speed movement and 1 Gbps for low speed movement in the downlink, utilizing a frequency-bandwidth limited IMT frequency band of 3 GHz.

BRIEF DESCRIPTION OF THE DRAWINGS

FIG. 10 illustrates a status of a cell area covered by a base station apparatus 40a;

FIG. 15 is a flow chart illustrating a procedure of assigning a downlink cell dedicated control channel DCDCCH and a downlink cell dedicated traffic channel DCDTCH of a base station apparatus to a low-frequency layer and/or a high-frequency layer.

Figure 1:
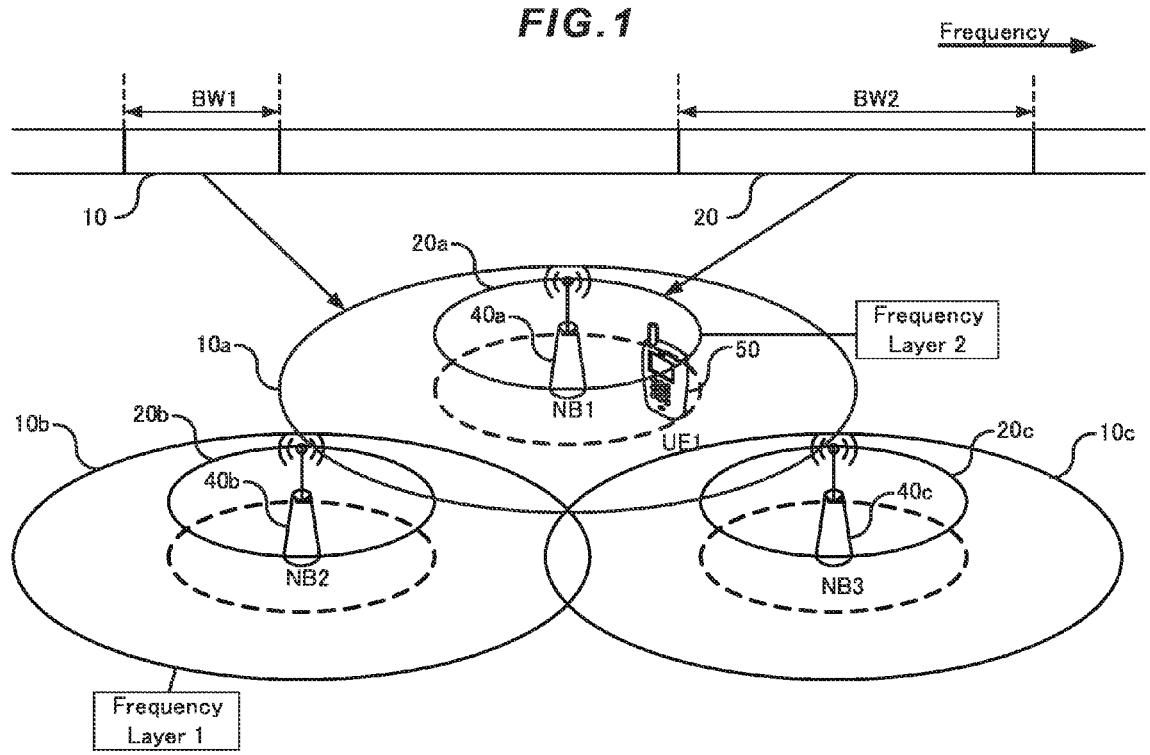
FIG. 1 illustrates a configuration of a mobile communication system according to a present embodiment.

EXPLANATION OF REFERENCE NUMERALS 40a to 40c: base station apparatus
50: mobile station apparatus
401: downlink transmission antenna
402: downlink transmission antenna
403: uplink reception antenna
404: control/storage unit
405: physical channel demapping unit
406: physical channel mapping unit
407: RF signal processor
408: baseband signal processor
409: filter (BPF)
410: RF transmitter
411: 415: digital-to-analog converter (DAC)
412: OFDM transmission signal processor
414: RF transmitter
416: OFDM transmission signal processor
418: RF receiver
419: digital-to-analog converter (ADC)
420: OFDM reception signal processor
421: uplink channel measurement unit
422: antenna unit
423: communication condition determination unit
501: downlink reception antenna
502: downlink/uplink reception and transmission antenna
503: RF signal processor
504: baseband signal processor
505: channel codec unit
506: application processor
507: display/input unit
508: control/storage unit
510: RF receiver
511: analog-to-digital converter
512: OFDM reception signal processor
513: cell search/downlink channel measurement unit
514: filter (BPF)
515: RF receiver
516: analog-to-digital converter
517: OFDM reception signal processor
518: RF transmitter
519: digital-to-analog converter
520: OFDM transmission signal processor
521: antenna unit
522: physical channel demapping unit
523: physical channel demapping unit
524: physical channel mapping unit

BEST MODES FOR CARRYING OUT THE INVENTION

Next, an embodiment according to the present invention will be described, referring to the drawings. The embodiment of the present invention proposes a method which, considering radio propagation characteristics of different frequency bands based on a radio channel configuration in EUTRA shown in FIG. 9, preliminarily assigns, at the time of system construction, all downlink cell common control channels DCCCCH and downlink cell common traffic channels DCCTCH constituting the system to a low-frequency band as a single mobile communication system, and assigns a downlink cell dedicated control channel DCDCCH and a downlink cell dedicated traffic channel DCDTCH to a low-frequency layer and/or a high-frequency layer according to a downlink radio propagation status and a communication requirement.

(A) Configuration of the Mobile Communication System According to the Present Embodiment FIG. 1 illustrates a configuration of a mobile communication system according to the present embodiment. As shown in FIG. 1, the mobile communication system comprises two frequency bandwidths having center frequencies significantly different from each other, i.e., two FLs (Frequency Layer). A first frequency layer FL1 has a frequency bandwidth BW1 and uses a low-frequency band, for example, 2.3 to 2.4 GHz, 698 to 806 MHz, or 450 to 470 MHz, of the existing IMT-2000 Plan Band or IMT Band. A second frequency layer FL2 has a frequency bandwidth BW2 and uses a high-frequency band, for example, 3.4 to 3.6 GHz, of the IMT Band. In comparison with FL1, FL2 has more outstanding rectilinear radio propagation property, larger radio propagation loss, larger building entry loss, and larger Doppler spread relative to the movement speed.

As shown in FIG. 1, since radio propagation loss in the 3 GHz frequency band is large considering the macro cell placement, if a base station apparatus 40a, for example, has identical transmission powers in FL1 and FL2, cover areas 10a, 10b and 10c of FL1 are larger than cover areas 20a, 20b and 20c of FL2. Cover areas of FL2 are discontinuous.

Figure 2:
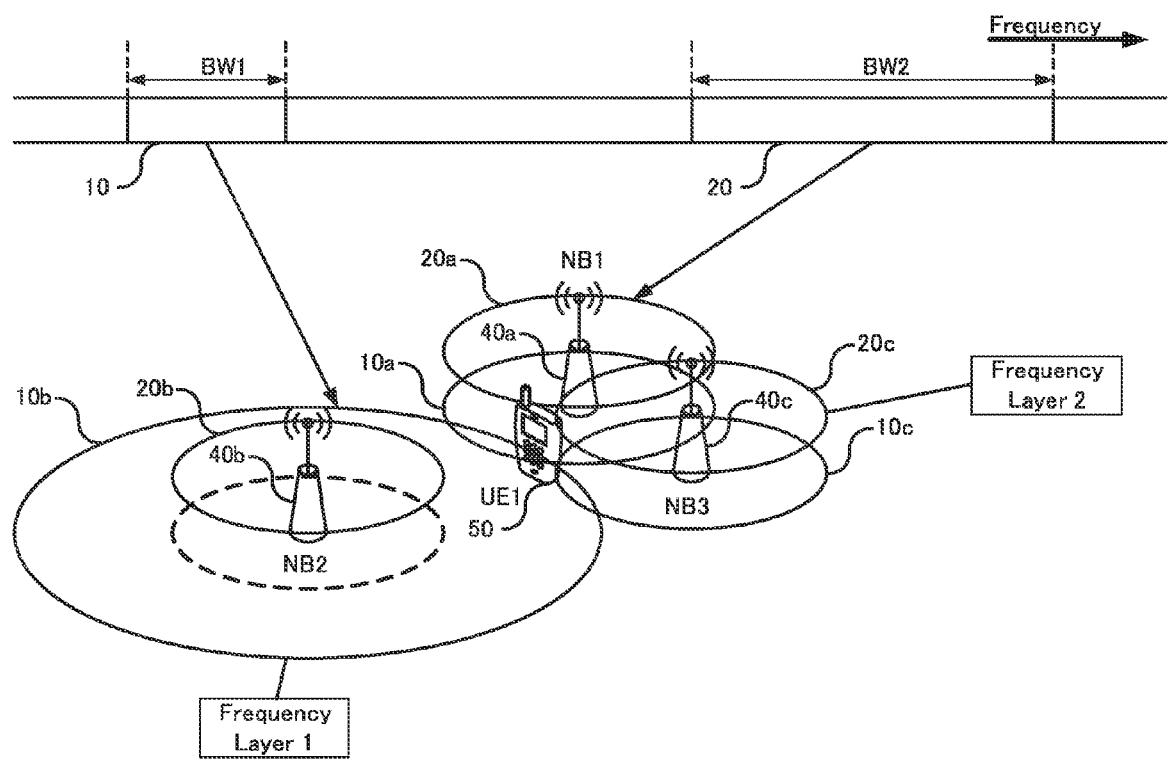
FIG. 2 illustrates a configuration of another mobile communication system according to the present embodiment.

FIG. 2 illustrates a configuration of another mobile communication system according to the present embodiment. As shown in FIG. 2, cover areas 20a and 20c of FL2 of the macrocells NB2 and NB3 can overlap, considering the macro cell placement.

In the mobile communication systems shown in FIGS. 1 and 2, a new radio access method INRI which will be standardized in 3GPP or the like in the future and is suitable for 3 GHz frequency band can be employed as the radio access method in FL2, whereas a radio access method suitable for a frequency band of 3 GHz or lower such as existing 2G and 3G (e.g., UTRA, EUTRA, EUTRA Plus, LTE Plus, LTE-Advanced) standardized in 3GPP or the like, or a new radio access method INRI which will be standardized in 3GPP or the like in the future and is suitable for a frequency band of 3 GHz or lower, can be employed as the radio access method in FL1.

As shown in FIGS. 1 and 2, FL1 cover areas 10a, 10b and 10c support an IMT-Advanced request condition of 100 Mbps for high speed movement in the downlink in the frequency bandwidth BW1, thus supporting a mobile station apparatus moving at high speed. FL2 cover areas 10a, 10b and 10c support an IMT-Advanced request condition of 1 Gbps for low speed movement in the frequency bandwidth BW2, thus supporting a mobile station apparatus moving at low speed.

Figure 3:
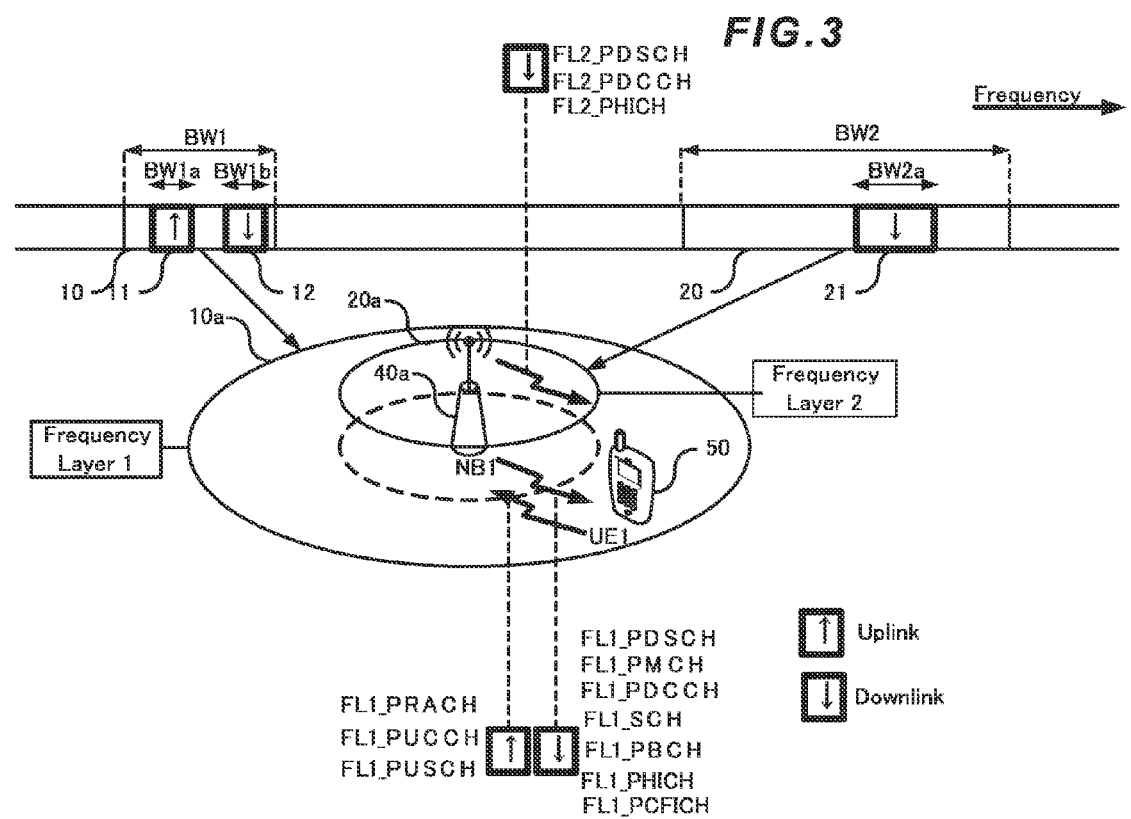
FIG. 3 illustrates a configuration of radio channels in a mobile communication system according to the present embodiment.
Figure 4:
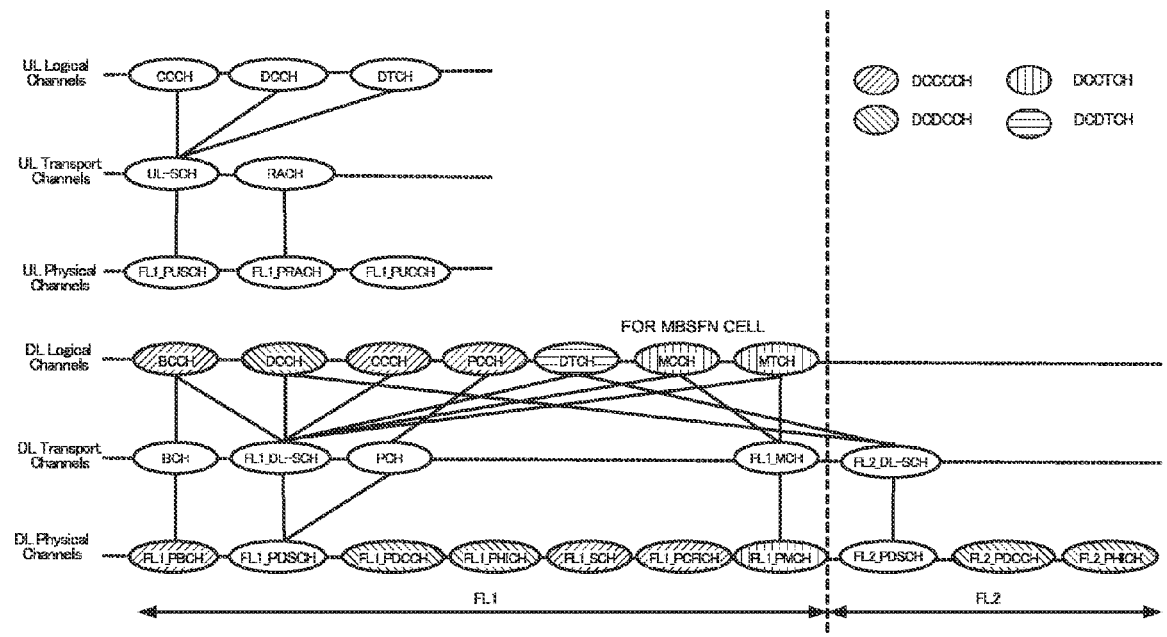
FIG. 4 illustrates a configuration of radio channels in a mobile communication system according to the present embodiment.

(B) Configuration of the Radio Channel in a Mobile Communication System According to the Present Invention FIGS. 3 and 4 illustrate a configuration of radio channels in the mobile communication system according to the present embodiment. As shown in FIG. 3, the uplink is assigned to a frequency bandwidth BW1a in FL1, and the downlink is assigned to a frequency bandwidth BW1b in FL1 and a frequency bandwidth BW2a in FL2. The system bandwidths BW1a and BW1b of FL1 (specific transmission and reception frequency bandwidth of the base station apparatus) can use frequency bandwidths such as 20 MHz, 15 MHz, 10 MHz, 5 MHz or the like, whereas the system bandwidth BW2a of FL2 (transmission frequency bandwidth of the base station apparatus) can use frequency bands such as 100 MHz, 50 MHz, 20 MHz or the like, which are broader than FL1. In other words, as shown in FIG. 4, radio channels required for a single mobile communication system are assigned.

Using the frequency bandwidth BW1a in FL1, the uplink of the mobile communication system assigns uplink physical channels such as a physical random access channel of FL1 (FL1_PRACH), a physical uplink control channel of FL1 (FL1_PUCCH), a physical uplink shared channel of FL1 (FL1_PUSCH) or the like. FL1_PRACH is also used at the time of initial access in FL2, at the time of handover within FL1 and between FL1 and FL2, and at the time of data generation in the downlink of FL1 and/or FL2. According to the downlink reception status of the mobile station apparatus in FL1 and/or FL2, FL1_PUCCH is also used for transmitting Hybrid ARQ ACK/NAK information bits, transmitting CQI information bits of downlink quality information of FL1 and/or FL2 estimated by the mobile station apparatus, transmitting the number of transmission data streams (which depends on the number of transmission antennas) and transmission pre-coding code book number information bits of the base station apparatus selected according to the reception status of the mobile station apparatus, and transmitting FL2 control information bits such as result of measurements of the mobile station apparatus in FL1 and/or FL2 and of a base station apparatus. FL1_PUSCH transmits uplink user data DTCH and control signals CCCH and DCCH. FL1_PUSCH can transmit a part of FL1 and/or FL2 control information bits using a part of the wireless resources of FL1_PUSCH instead of FL1_PUCCH.

Using the frequency bandwidth BW1a in FL1, apart of the downlink of the mobile communication system assigns a synchronization channel of FL1 (FL1_SCH), a broadcast channel of FL1 (FL1_PBCH), a physical downlink shared channel of FL1 (FL1_PDSCH), a physical downlink control channel of FL1 (FL1_PDCCH), a physical Hybrid ARQ indication channel of FL1 (FL1_PHICH), a physical control channel format indication channel of FL1 (FL1_PCFICH), and a physical multicast channel of FL1 (FL1_PMCH). FL1_SCH and FL1_PBCH are DCCCCHs.

FL1_DL-SCH and PCH corresponding to FL1_PDSCH include BCCH, CCCH, DCCH, PCCH, DTCH, MCCH and MTCH. DCCH and DTCH can be mapped onto FL1_PDSCH and/or FL2_PDSCH, depending on radio propagation status in BW1b of FL1 and BW2a of FL2, and communication requirements such as the movement speed of the mobile station apparatus, the desired data transmission speed, the desired communication quality requirement, or the like. FL1_PDCCH transmits, radio resource allocation information bits of FL1_DL-SCH and PCH, information bits of Hybrid ARQ associated with FL1_DL-SCH, or an Uplink scheduling grant signal (control signal). BCCH, CCCH and PCCH are DCCCCHs, whereas DTCH is a DCDTCH. MCCH and MTCH are DCCTCHs in the case of MNSFN, whereas MCCH and MTCH are DCDTCHs in the case of SCPTM.

Physical Hybrid ARQ indication channel FL1_PHICH transmits Hybrid ARQ ACK/NAKs information bits corresponding to the uplink FL1_PUSCH. FL1_PHICH is a DCDCCH. The physical multicast channel FL1_PMCH is used for MBMS. Similarly to FL1_DL-SCH, MCCH and MTCH can be assigned to MCH. CCCH includes RRC messages associated with FL1 and/or FL2. Specifically, RRC messages such as RRC CONNECTION SETUP of an FL2 downlink, RRC CONNECTION RE-ESTABLISHMENT REJECT/REQUEST, for example, are included.

The physical control format indication channel PCFICH transmits information bits of the number of the OFDM symbols used in the physical downlink control channel of FL1 (FL1_PDCCH) and the physical downlink control channel of FL2 (FL2_PDCCH).

Using the frequency bandwidth BW2a in FL2, a part of the downlink of the mobile communication system assigns a physical downlink shared channel of FL2 (FL2_PDSCH), a physical downlink control channel of FL2 (FL2_PDCCH), and a physical Hybrid ARQ indication channel of FL1 (FL2_PHICH). FL2_PDCCH and FL2_PHICH are DCD-CCHs.

Only DCCH and DTCH are included in FL2_DL-SCH corresponding to FL2_PDSCH. DCCH and DTCH can be mapped onto FL1_PDSCH and/or FL2_PDSCH, depending on radio propagation status in BW1b of FL1 and BW2a of FL2, and communication requirements such as the movement speed of the mobile station apparatus, the desired data transmission speed, the desired communication quality requirement, or the like. Additionally, FL2_PDCCH transmits radio resource allocation information bits of FL2_DL-SCH and information bits of Hybrid ARQ associated with FL2_DL-SCH. Although FIG. 3 illustrates the radio access method of FL1 in FDD, it may be in TDD.

Figure 5:
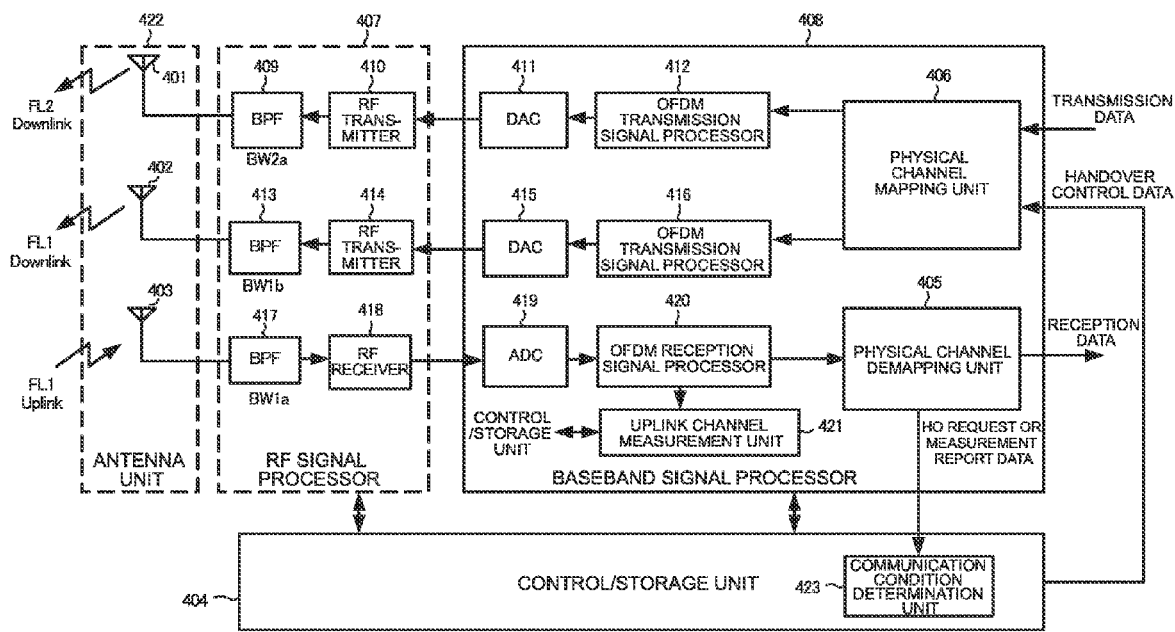
FIG. 5 illustrates a schematic configuration of a base station apparatus according to the present embodiment.

(C) Configuration of the Base Station Apparatus According to the Present Embodiment and a Transmission Method of a Radio Channel FIG. 5 illustrates a schematic configuration of a base station apparatus according to the present embodiment. The base station apparatus comprises an antenna unit 422, an RF signal processor 407, a baseband signal processor 408 and a control/storage unit 404. If the uplink and downlink support MIMO, a plurality of antenna units, RF signal processors, and baseband signal processors are included.

The antenna unit 422 includes an uplink reception antenna 403 of FL1, a downlink transmission antenna 402 of FL1, and a downlink transmitting antenna 401 of FL2. A single reception and transmission antenna may be shared as the antennas of FL1. The RF signal processor 407 includes filter units 409, 413 and 417 having respectively frequency bandwidths BW2a, BW1b and BW1a corresponding to respective antennas, and an RF transmitter 414 of FL1, an RF receiver 418 of FL1, and a transmitter 410 of FL2. The baseband signal processor has an analog-to-digital converter 419, digital-to-analog converters 411 and 415, an OFDM transmission signal processor 416 of FL1, an OFDM reception signal processor 420 of FL1, an OFDM transmission signal processor 412 of FL2, a physical channel mapping unit 406, a physical channel demapping unit 405, and an uplink channel measurement unit 421.

Transmission data transmitted from a core network (not shown) is input to the physical channel mapping unit 406 and mapped onto each downlink physical channel shown in FIGS. 3 and 4. Specifically, the physical channel mapping unit 406 generates a Primary SCH sequence and a Secondary SCH sequence based on cell ID information included in the transmission data.

Figure 6:
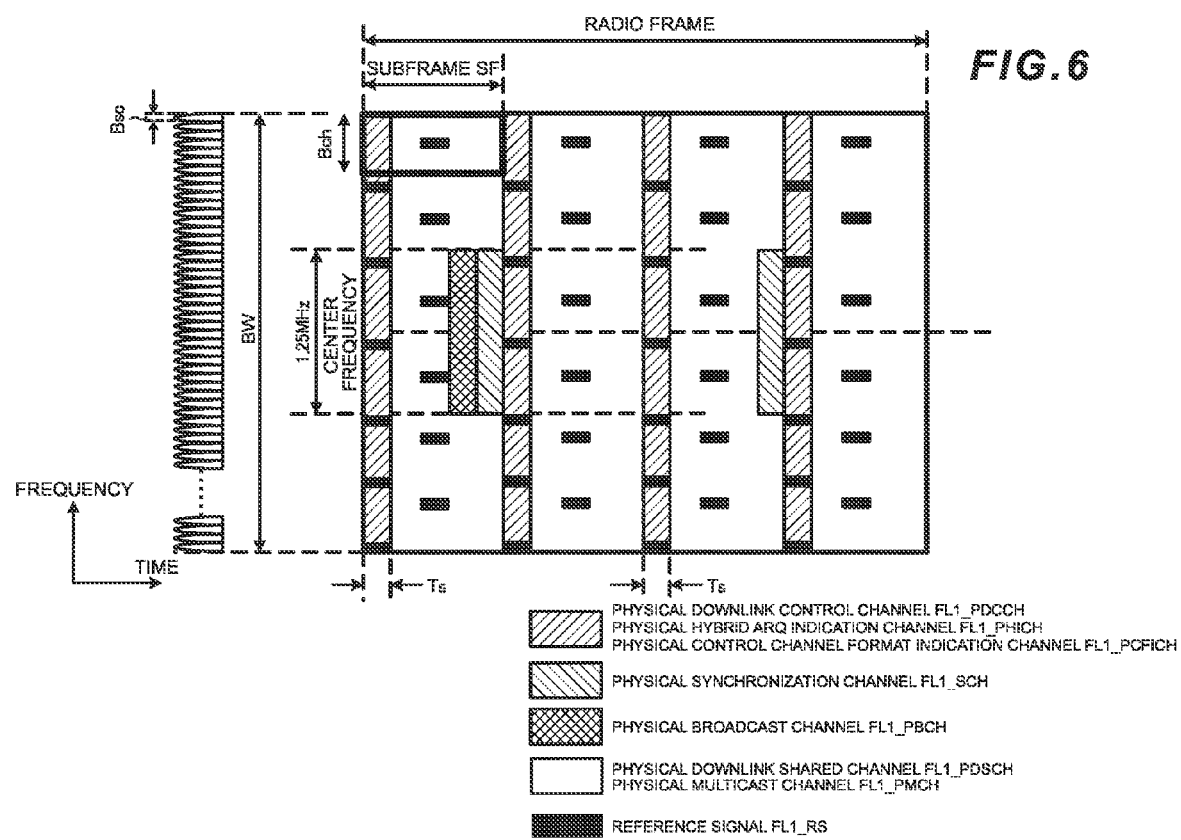
FIG. 6 illustrates a configuration of a radio frame.
Figure 7:
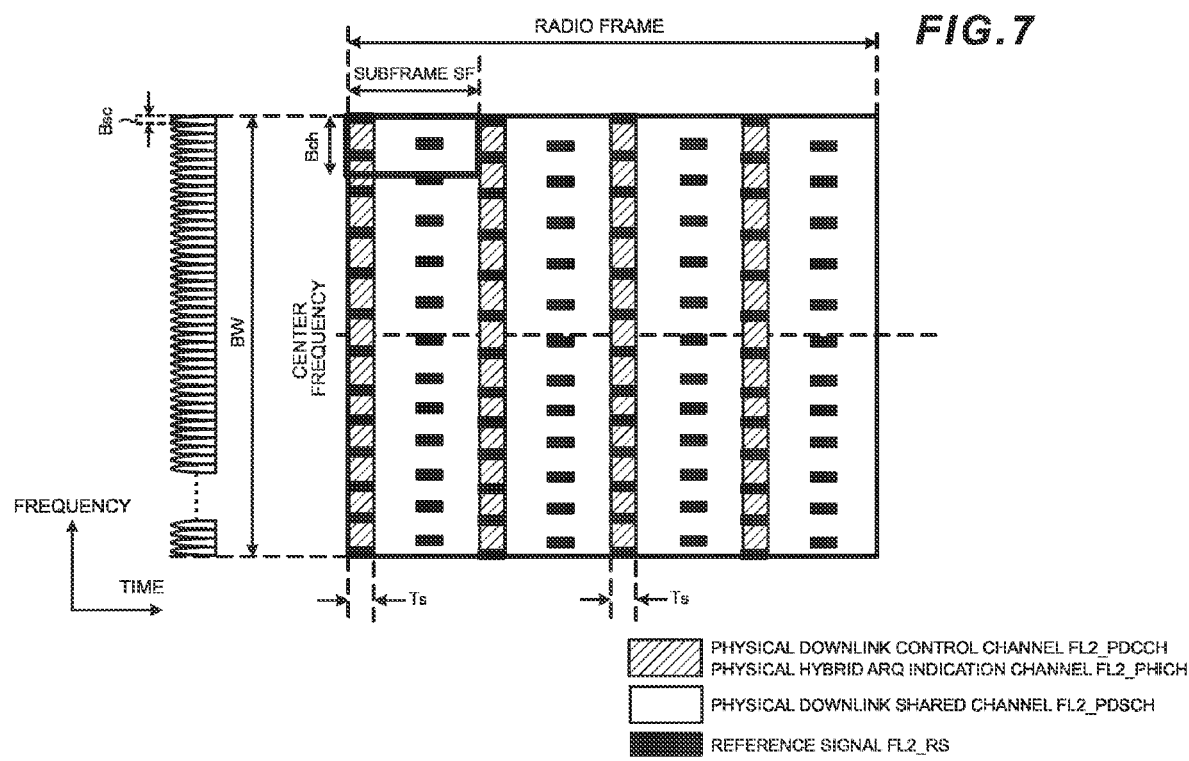
FIG. 7 illustrates a configuration of a radio frame.

FIGS. 6 and 7 illustrate a configuration of a radio frame. Using the broadcast data (BCCH) included in the transmission data, data-modulation is performed according to a fixed modulation/encoding system, and the modulated data is mapped onto a fixed OFDM symbol and subcarrier to generate a broadcast channel FL1_PBCH, as shown in FIG. 6.

Based on the scheduling information transmitted from the control/storage unit 404, user data (DTCH), broadcast data (BCCH), MBMS data (MCCH, MTCH), paging data (PCCH), dedicated upper layer control data (DCCH), and common upper layer control data (CCCH) included in the transmission data are data-modulated according to a predetermined modulation/encoding system, and mapped onto a predetermined OFDM symbol and subcarrier to generate a physical downlink shared channel FL1_PDSCH, as shown in FIG. 6. DTCH and DCCH can be mapped onto FL1_PDSCH and/or FL2_PDSCH, using handover control data from the communication condition determination unit 423 of the control/storage unit 404, depending on radio propagation status in BW1b of FL1 and BW2a of FL2 as well as communication requirements such as the movement speed of the mobile station apparatus, the desired data transmission speed, and the desired communication quality requirement. The common upper layer control data (CCCH) includes RRC messages associated with FL1 and/or FL2.

For example, RRC messages such as RRC CONNECTION SETUP or RRC CONNECTION RE-ESTABLISHMENT REJECT/REQUEST of FL2 downlink RB (Radio Bearer) are mapped onto FL1_PDSCH.

Based on the dedicated physical layer control data of FL1 from the control/storage unit 404, data modulation is performed according to a fixed modulation/encoding system and the modulated data is mapped onto the fixed OFDM symbol and subcarrier to generate a physical downlink control channel FL1_PDCCH, as shown in FIG. 6. Based on the physical HARQ indication data of FL1 from the control/storage unit 404, data modulation is performed according to a fixed modulation/encoding system and the modulated data is mapped onto a fixed OFDM symbol and subcarrier to generate a physical HARQ indication channel FL1_PHICH, as shown in FIG. 6.

Based on the format indication data of FL1_PDCCH of FL1 and FL2_PDCCH from the control/storage unit 404, data modulation is performed according to a fixed modulation/encoding system and the modulated data is mapped onto a fixed OFDM symbol and subcarrier to generate a physical control channel format indication channel FL1_PCFICH, as shown in FIG. 6.

Based on the MBMS data (MTCH, MCCH) included in the transmission data, data modulation is performed according to a predetermined modulation/encoding system and the modulated data is mapped onto a predetermined OFDM symbol and subcarrier to generate a physical multicast channel FL1_PMCH, as shown in FIG. 6. Based on the scheduling information transmitted from the control/storage unit 404, the user data (DTCH) and the dedicated upper layer control data (DCCH) included in the transmission data are data-modulated according to a predetermined modulation/encoding system and mapped onto a predetermined OFDM symbol and subcarrier to generate the physical downlink shared channel of FL2 (FL2_PDSCH), as shown in FIG. 7. Based on the handover control data from the communication condition determination unit 423 of the control/storage unit 404, DTCH and DCCH can be mapped onto FL1_PDSCH and/or FL2_PDSCH, depending on radio propagation status in BW1b of FL1 and BW2a of FL2, as well as the communication requirements such as the movement speed of the mobile station apparatus, the desired data transmission speed, and the desired communication quality requirement.

FL1_PBCH, FL1_PDSCH, FL1_PDCCH, FL1_PHICH, FL1_PCFICH, FL1_SCH, and FL1_PMCH generated by the physical channel mapping unit 406 are transmitted to the downlink of FL1 via the OFDM transmission signal processor 416, the RF transmitter 414, and the like.

Based on the dedicated physical layer control data of FL2 from the control/storage unit 404, data modulation is performed according to a fixed modulation/encoding system and the modulated data is mapped onto a fixed OFDM symbol and subcarrier to generate the physical downlink control channel of FL2 (FL2_PDCCH), as shown in FIG. 7. Based on the physical HARQ indication data of FL2 from the control/storage unit 404, data modulation is performed according to a fixed modulation/encoding system and the modulated data is mapped onto a fixed OFDM symbol and subcarrier to generate the physical HARQ indication channel of FL2 (FL2_PHICH), as shown in FIG. 6.

The radio signal transmitted from the uplink of FL1 is converted into a baseband digital signal by the antenna 403, the RF receiver 418, the OFDM reception signal processor 420, and the like, and input to the physical channel demapping unit 405, where the physical random access channel of FL1 (FL1_PRACH), the physical uplink control channel of FL1 (FL1_PUCCH), and the FL1_physical uplink shared channel FL1_PUSCH shown in FIGS. 3 and 4 are extracted.

Based on the measurement result information bits of the radio propagation status in BW1b of FL1 included in FL1_PUCCH and BW2a of FL2, as well as communication requirement parameters such as the movement speed of the mobile station apparatus, the desired data transmission speed, and the desired communication quality requirement, it is determined whether or not to map the user data (DTCH) and dedicated upper layer control data (DCCH) included in the transmission data onto FL1_DPSCH and/or FL2_DPSCH. Without transmission of the communication requirement parameter such as the movement speed of the mobile station apparatus, desired data transmission speed, and desired communication quality requirement from the mobile station apparatus, the base station apparatus itself can calculate them from various communication parameters.

Figure 8:
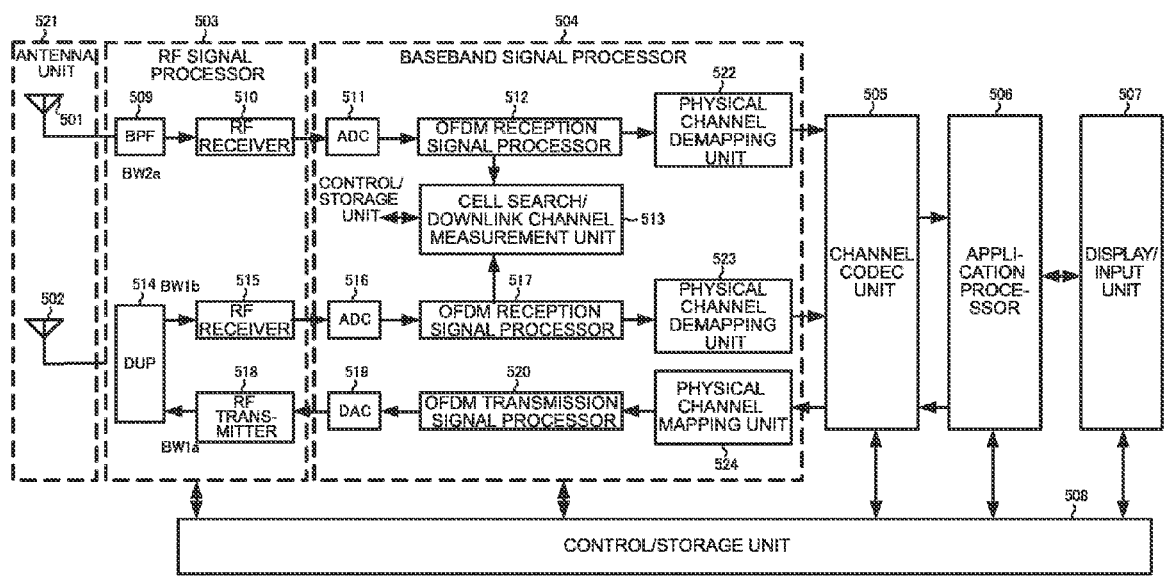
FIG. 8 illustrates a schematic configuration of a mobile station apparatus according to the present embodiment.

(D) Configuration of the Mobile Station Apparatus According to the Present Embodiment and Reception Method of Radio Channels FIG. 8 illustrates a schematic configuration of the mobile station apparatus according to the present embodiment. As shown in FIG. 8, the mobile station apparatus comprises an antenna unit 521, an RF signal processor 503, a baseband signal processor 504, a channel codec unit 505, an application processor 506, and a display/input unit 507. If the uplink and downlink support MIMO, a plurality of antenna units, RF signal processors, and baseband signal processors are included.

The antenna unit 521 includes a downlink/uplink reception and transmission antenna 502 of FL1 and a downlink reception antenna 501 of FL2. The RF signal processor 503 includes filter units 514 and 509 having respectively frequency bandwidths BW1a, BW1b and BW2 corresponding to respective antennas, an RF transmitter 518 of FL1, an RF receiver 515 of FL1, and an RF receiver 510 of FL2. The baseband signal processor 504 includes analog-to-digital converters 511 and 516, a digital-to-analog converter 519, an OFDM transmission signal processor 520 of FL1, an OFDM reception signal processor 517 of FL1, an OFDM reception signal processor 512 of FL2, a cell search/downlink channel measurement unit 513, a physical channel demapping units 523 and 522 of FL1 and FL2, and a physical channel mapping unit 524 of FL1.

Transmission data transmitted from the channel codec unit 505 and/or the control/storage unit 508 is input to the physical channel mapping unit 524 and mapped onto each physical channel of the uplink shown in FIGS. 3 and 4. Specifically, the transmission data transmitted from the channel codec unit 505 and/or the control/storage unit 508 at the time of initial access, handover, generation of uplink/downlink data, or the like, is data-modulated according to a predetermined modulation/encoding system and mapped onto a predetermined OFDM symbol and subcarrier to generate a physical random access channel FL1_PRACH.

The transmission data transmitted from the channel codec unit 505 and/or the control/storage unit 508 is data-modulated according to a predetermined modulation/encoding system and mapped onto a predetermined OFDM symbol and subcarrier to generate a physical uplink control channel FL1_PUCCH. FL1_PUCCH transmits control information bits from the mobile station apparatus, and has mapped thereon information bits such as Hybrid ARQ ACK/NAK information bits according to the radio propagation status of BW1b of FL1 and/or BW2a of FL2 of the mobile station apparatus, Scheduling Request information bits requesting the base station apparatus for allocation of uplink radio resources, quality information CQI information bits of BW1b of FL1 and/or BW2a of FL2 estimated from the result of measurement of the cell search/downlink channel measurement unit 513, and information bits such as the number of transmission data streams (which depends on the number of transmission antennas) of the base station apparatus selected according to the radio propagation status of BW1b of FL1 and/or BW2a of FL2 of the mobile station apparatus and transmission pre-coding code book number, and control information bits such as the result of measurement of the mobile station apparatus.

Based on the scheduling information transmitted from the control/storage unit 508, data modulation is performed on user data (DTCH), dedicated upper layer control data (DCCH), and common upper layer control data (CCCH) included in the transmission data from the channel codec unit 505 according to a predetermined modulation/encoding system and the modulated data is mapped onto a predetermined OFDM symbol and subcarrier to generate a physical uplink shared channel FL1_PUSCH. Additionally, FL1_PUSCH can transmit a part of the control information bits from the mobile station apparatus using a part of the radio resource, instead of FL1_PUCCH.

Downlink demodulated data transmitted from the OFDM reception signal processors 512 and 517 are input to the physical channel demapping units 522 and 523, where each physical channel of the downlink shown in FIGS. 3 and 4 is extracted. Specifically, the FL1 downlink demodulated data transmitted from the OFDM reception signal processor 517 is input to the physical channel demapping unit 523, and a synchronization channel FL1_SCH, a broadcast channel FL1_PBCH, a physical downlink shared channel FL1_PDSCH, a physical downlink control channel FL1_PDCCH, a physical Hybrid ARQ indication channel FL1_PHICH, and a physical multicast channel FL1_PMCH are extracted from the predetermined OFDM symbol and subcarrier, as shown in FIG. 6. Additionally, data of the synchronization channel FL1_SCH and the reference signal RS of FL1 are transmitted to the cell search/downlink channel measurement unit 513, where radio propagation status of BW1b of FL1 is measured. The measurement result is reported to the base station apparatus via FL1_PUCCH as a handover request (HO Request) or a Measurement Report.

The physical channel demapping unit 523 extracts RRC messages associated with FL1 and/or FL2 from the common upper layer control data (CCCH) included in FL1_PDSCH. Specifically, RRC messages such as RRC CONNECTION SETUP and RRC CONNECTION RE-ESTABLISHMENT REJECT/REQUEST of the FL2 downlink radio bearer RB, for example, are extracted from FL1_PDSCH via the physical channel demapping unit 523.

Similarly, the FL2 downlink demodulated data transmitted from the OFDM reception signal processor 512 is input to the physical channel demapping unit 522, where the physical downlink shared channel FL2_PDSCH, the physical downlink control channel FL2_PDCCH, and the physical Hybrid ARQ indication channel FL2_PHICH are extracted from the predetermined OFDM symbol and subcarrier, as shown in FIG. 7. Additionally, the data of the reference signal RS of FL2 is transmitted to the cell search/downlink channel measurement unit 513, where the radio propagation status of BW2a of FL2 is measured. The measurement result is reported to the base station apparatus via FL1_PUCCH as a handover request (HO Request) or a measurement report (Measurement Report).

Figure 9:
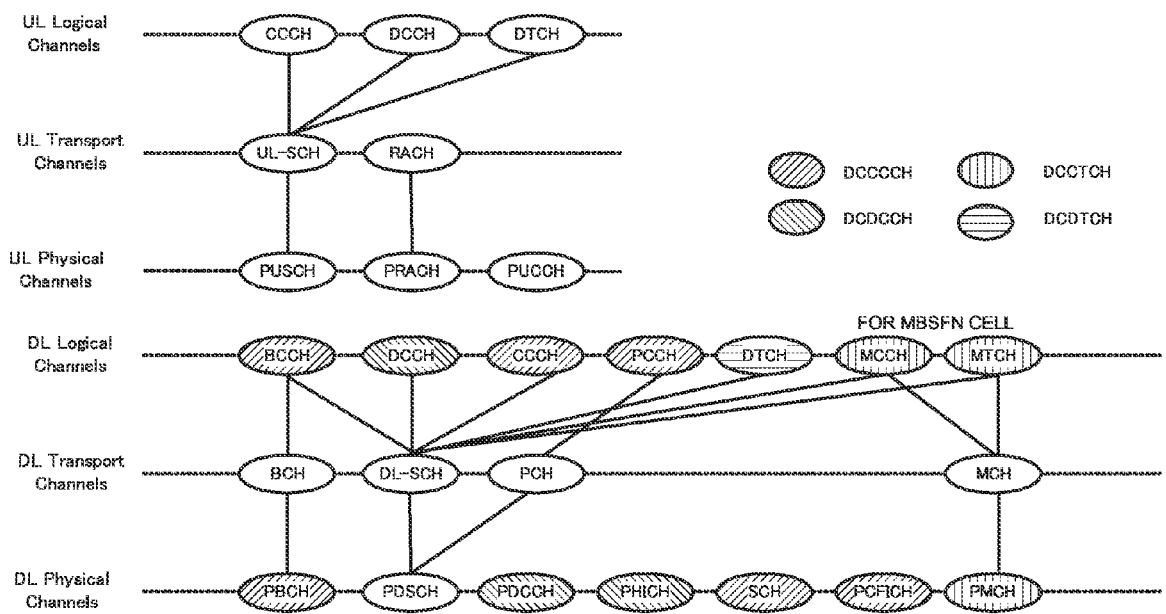
FIG. 9 illustrates the correspondence relationship between a radio physical channel, a transport channel, and a logical channel in EUTRA.

The embodiments of the present invention have proposed a radio channel configuration which, considering the radio propagation characteristics of different frequency bands based on the radio channel configuration in the above-mentioned EUTRA, assigns all downlink cell common control channels DCCCCH and downlink cell common traffic channels DCCTCH constituting the next generation mobile communication system to a low-frequency band without applying them to a high-frequency band, and a data transmission and reception method of a base station apparatus and a mobile station apparatus. However, deliberation of the new radio access technology INRI of IMT-Advanced and establishment of the specification thereof are yet to be completed and the radio channel configuration of EUTRA as shown in FIG. 9 may not necessarily be adopted. The configuration of and correspondence relationship among radio channels such as physical channels, transport channels, and logical channels may be different, and mapping of user data and control data may be different. In other words, the downlink cell common control channel DCCCCH may be replaced by DCCCD (Downlink Cell Common Control Data), the downlink cell common traffic channel DCCTCH may be replaced by DCCTD (Downlink Cell Common Traffic Data), the downlink cell dedicated control channel DCDCCH may be replaced by DCDCD (Downlink Cell Dedicated Control Data), and the downlink cell dedicated traffic channel DCDTCH may be replaced by DCDTD (Downlink Cell Dedicated Traffic Data).

Figure 10:
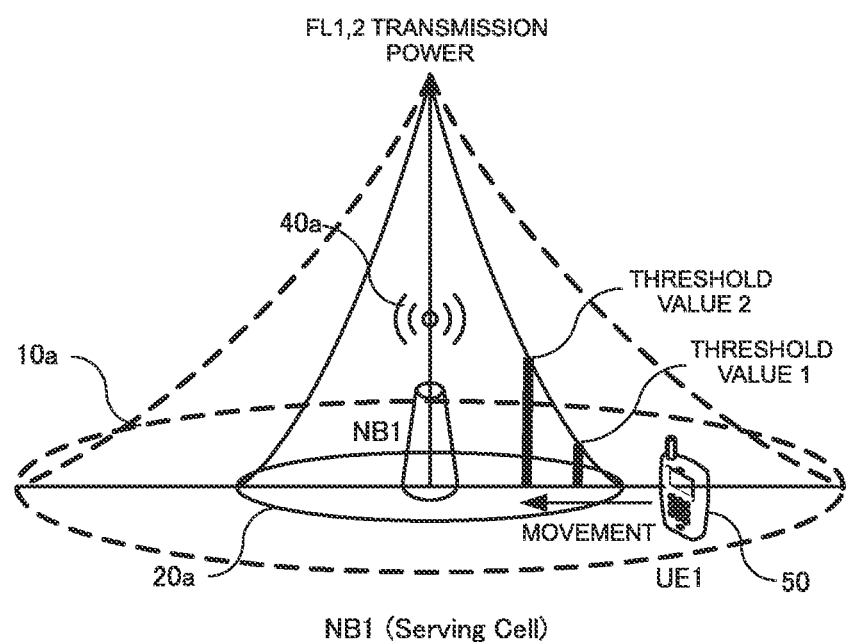

(E) First Allocation Method of a Downlink Cell Dedicated Control Channel and a Downlink Cell Dedicated Traffic Channel According to the Present Embodiment FIG. 10 illustrates the status of a cell area covered by the base station apparatus 40a. Since radio propagation loss in FL2 is larger than that in FL1, a cover area 10a of FL1 is larger than a cover area 20a of FL2, if transmission powers of the base station apparatus 40a in FL1 and FL2 are identical.

After power-on, the mobile station apparatus 50 receives FL1_SCH of FL1, selects the base station apparatus 40a as a camped cell, according to the determination of the cell search/downlink channel measurement unit 513, and, following positional registration procedures such as reception of FL1_BCH, transmission of FL1_PRACH, and reception of CCCH of FL1_PDSCH, enters an RCC IDLE Mode in the cover area 10a of FL1 of the base station apparatus 40a. When there is call origination from the mobile station apparatus or when there is call termination to the mobile station apparatus such as transmission of FL1_PRACH, the mobile station apparatus enters an RCC CONNECTED Mode, following call connection procedures such as reception of FL1_PCCH included in FL1_PDSCH. In the RCC CONNECTED Mode, reference signals FL1_RS and FL2_RS of FL1 and FL2 of the connected base station apparatus (Serving Cell) 40a and peripheral base station apparatuses (the base station apparatuses 40b and 40c shown in FIG. 1, for example) are extracted by the cell search/downlink channel measurement unit 513 of the mobile station apparatus from a radio frame structure as shown in FIGS. 6 and 7, and numerical values indicating the downlink channel status such as reception quality indicators of FL1_RS and FL2_RS of each base station apparatus, for example, RSRP (Reference Signal Received Power), RSSI (Receive Signal Strength Indication), and RSRQ (Reference Signal Received Quality) are measured. The measurement result is reported to the base station apparatus (Serving Cell) 40a via FL1_PUCCH as an HO Request or a Measurement Report, either periodically or non-periodically.

Figure 11:
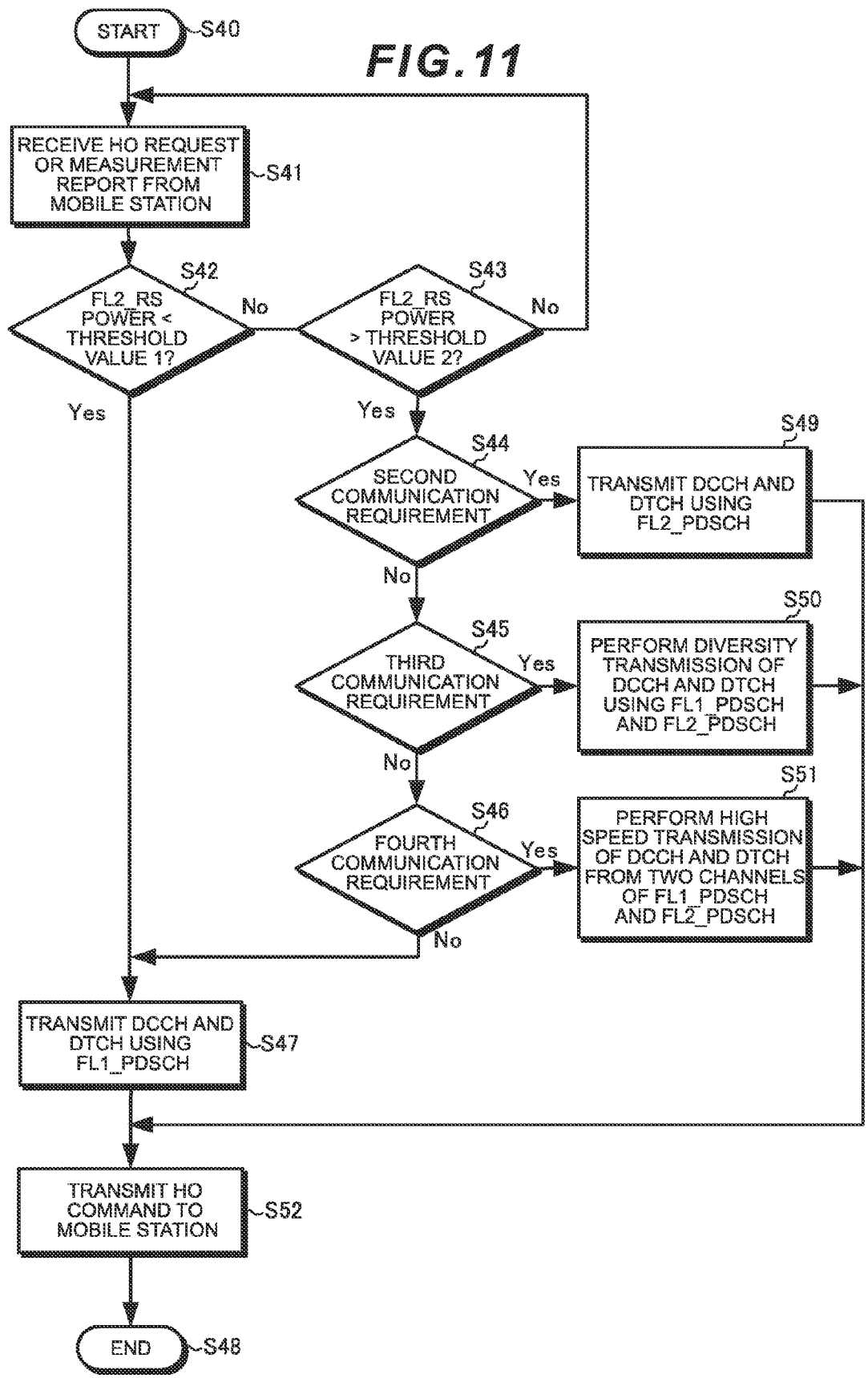
FIG. 11 is a flow chart illustrating a procedure of assigning a downlink cell dedicated control channel DCDCCH and a downlink cell dedicated traffic channel DCDTCH of a base station apparatus to a low-frequency layer and/or a high-frequency layer.

FIG. 11 is a flow chart illustrating a procedure of assigning a downlink cell dedicated control channel DCDCCH and a downlink cell dedicated traffic channel DCDTCH of the base station apparatus to a low-frequency layer and/or a high-frequency layer. Specifically, an HO Request or a Measurement Report from the mobile station apparatus is received, and the reception quality indicators of FL1_RS and FL2_RS of each base station apparatus reflecting the downlink radio propagation status, for example, the average received power RSRP is extracted (S41). The received power of FL2_RS (FL2_RS_RSRP) of the connected base station apparatus (Serving Cell) 40a is compared with a threshold value 1 and a threshold value 2 (threshold value 2>threshold value 1) preliminarily stored in the control/storage unit 404 of the base station apparatus as system parameters (S42, S43), and if FL2_RS_RSRP is smaller than the threshold value 1 (Yes in S42), the user data (DTCH) and the dedicated upper layer control data (DCCH) are mapped onto FL1_PDSCH (S47). If FL2_RS_RSRP is larger than the threshold value 1 and smaller than the threshold value 2 (No in S43), the process flow returns to reception (S41) of the HO Request or the Measurement Report from the mobile station apparatus.

If, on the other hand, FL2_RS_RSRP is larger than the threshold value 2 (Yes in S43), the mapping method of DTCH and DCCH is changed according to the communication requirement parameters. In the case of the second communication requirement (Yes in S44), DTCH and DCCH are mapped onto FL2_PDSCH (S49). In the case of the third communication requirement (Yes in S45), DTCH and DCCH are mapped onto FL1_PDSCH and FL2_PDSCH, and diversity transmission is performed (S50).

Specifically, the physical channel mapping unit 406 precodes the input user data (DTCH) and the dedicated upper layer control data (DCCH) into two identical data streams (which depend on the frequency layer), for example, and maps them onto FL1_PDSCH and FL2_PDSCH, respectively, thereby realizing transmission diversity through BW1b of FL1 and BW2a of FL2. As the pre-coding, SFTD (Space Frequency Transmit Diversity), STTD (Space Time Transmit Diversity), or FTTD (Frequency Time Transmit Diversity), for example, can be used.

In the case of the fourth communication requirement (Yes in S46), DTCH and DCCH are mapped onto two channels, FL1_PDSCH and FL2_PDSCH, thereby achieving high-speed transmission (S50). Specifically, the input user data (DTCH) and the dedicated upper layer control data (DCCH) are separated into two different data streams (which depends on the frequency layer) and mapped onto FL1_PDSCH and FL2_PDSCH, respectively, in the physical channel mapping unit 406, for example, thereby achieving high data transmission speed through BW1b of FL1 and BW2a of FL2. After the method of mapping the user data (DTCH) and the dedicated upper layer control data (DCCH) onto FL1_PDSCH and/or FL2_PDSCH has been determined (S47, S49, S50 and S51), an HO Command for assigning a radio channel to the mobile station apparatus is transmitted to the mobile station.

In order to prevent chattering of mapping of the user data (DTCH) and the dedicated upper layer control data (DCCH) between FL1_PDSCH and FL2_PDSCH, two threshold values, threshold value 1 and threshold value 2 (threshold value 2>threshold value 1) are provided. The threshold value 2 may be set equal to the threshold value 1 (threshold value 2=threshold value 1).

Figure 12:
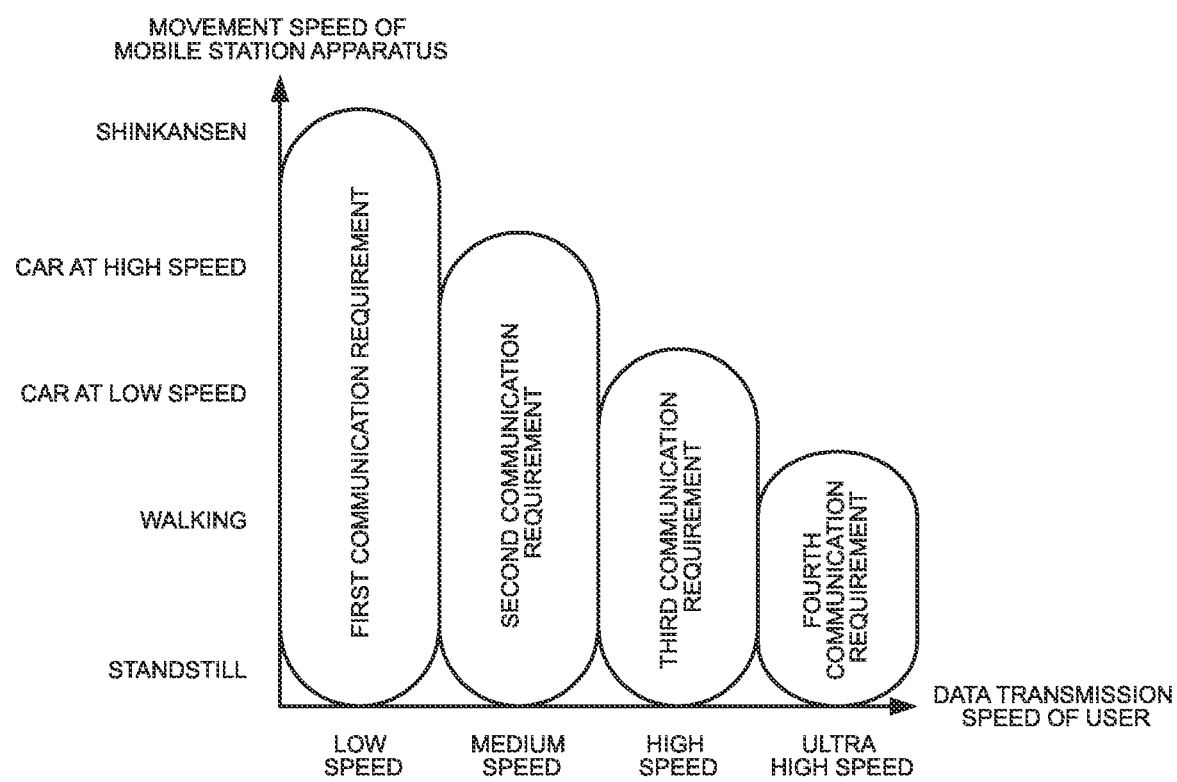
FIG. 12 illustrates the relationship between a user data transmission speed and a movement speed of the mobile station apparatus.
Figure 13:
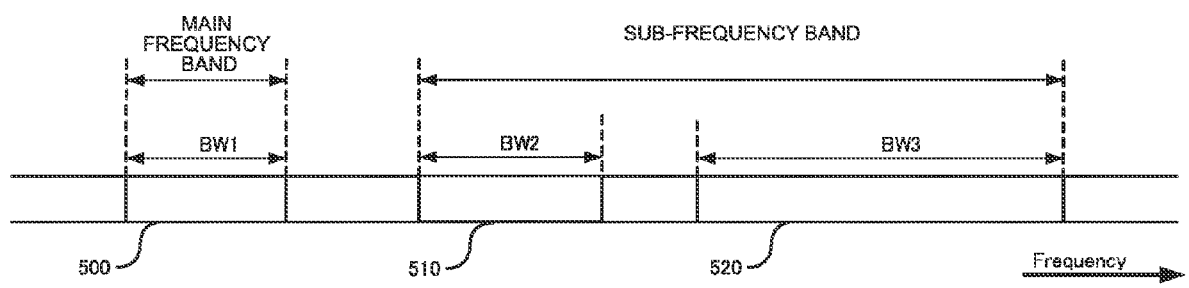
FIG. 13 illustrates an exemplary use of a plurality of frequency bands in a communication system.

Communication requirements can be defined by the movement speed of the mobile station apparatus, the desired data transmission speed, the desired communication quality requirement, or the like. If, for example, the desired communication quality requirement of the mobile station apparatus is constant, it can be defined as shown in FIG. 12 according to the movement speed of the mobile station apparatus and the data transmission speed. Additionally, with the fourth communication requirement, for example, the user data transmits two different data streams via two radio channels FL1_PDSCH and FL2_PDSCH, thereby providing the mobile station apparatus with an ultra high data transmission speed of 1 Gbps or more, if the movement speed of the mobile station apparatus is low, i.e. in a range from standstill to walking speed and to a car running at a low speed of about 30 km/h. With the third communication requirement, the user data performs diversity transmission of two identical data streams (original data stream) via two radio channels FL1_PDSCH and FL2_PDSCH, thereby providing the mobile station apparatus with a high data transmission speed of 100 Mbps or more, if the movement speed of the mobile station apparatus is medium, i.e. in a range from standstill to walking speed and to a car running at a medium speed of about 60 km/h.

Additionally, with the second communication requirement, the user data transmits a single data stream via a single radio channel FL2_PDSCH, thereby providing the mobile station apparatus with a medium data transmission speed of about 100 Mbps, if the movement speed of the mobile station apparatus is high, i.e. in a range from standstill to walking speed and to a car running at a high speed of about 120 km/h.

With the first communication requirement, the user data transmits a single data stream via a single radio channel of FL1_PDSCH, thereby providing the mobile station apparatus with a low data transmission speed of 100 Mbps or less, if the movement speed of the mobile station apparatus is ultra high, i.e. in a range from standstill to walking speed and to the Shinkansen (Bullet Train) running at a high speed of about 300 km/h.

The data streams described herein correspond to different frequency layers. Of course it is possible to provide an ultra high data transmission speed by utilizing a radio communication technology (MIMO: Multiple Input Multiple Output) that subdivides data streams in each frequency layer and transmits them to the mobile station apparatus via a plurality of transmission antennas to expand the data transmission and reception band with a plurality of antennas combined.

In the mobile station apparatus, the cell search/downlink channel measurement unit 513 can estimate the movement speed of the mobile station apparatus from communication parameters such as Doppler frequency shift of uplink reception signals, uplink channel variation, and uplink reception signal variation speed, and the control/storage unit 508 can estimate the desired data transmission speed and the desired communication quality requirement from communication parameters such as category of the mobile station apparatus, type of service, type of radio bearer RB, and QoS (Quality of Service). The mobile station apparatus can transmit a parameter indicating the communication requirement to the base station apparatus via the radio FL1_PUCCH.

Similarly, in the base station apparatus, the communication condition determination unit 423 of the control/storage unit 404 can estimate the movement speed of the mobile station apparatus from communication parameters such as Doppler frequency shift of uplink reception signals, uplink channel variation, uplink reception signal variation speed, and/or HO Request or Measurement Report from the mobile station apparatus. Additionally, it can estimate the desired data transmission speed and the desired communication quality requirement of the mobile station apparatus from communication parameters such as category of the mobile station apparatus reported from the mobile station apparatus at the time of location registration, type of service notified to the mobile station apparatus at the time of RRC CONNECTION SETUP, type of radio bearer RB, and QoS (Quality of Service).

In the case of SCPTM, MCCH and MTCH can be mapped onto FL1_PMCH and/or FL2_PMCH (not shown), depending on the radio propagation status in BW1$b$ of FL1 and BW2$a$ of FL2, as well as communication requirements such as the movement speed of the mobile station apparatus, the desired data transmission speed, and the desired communication quality requirement, similarly to DCCH and DTCH.

Figure 14:
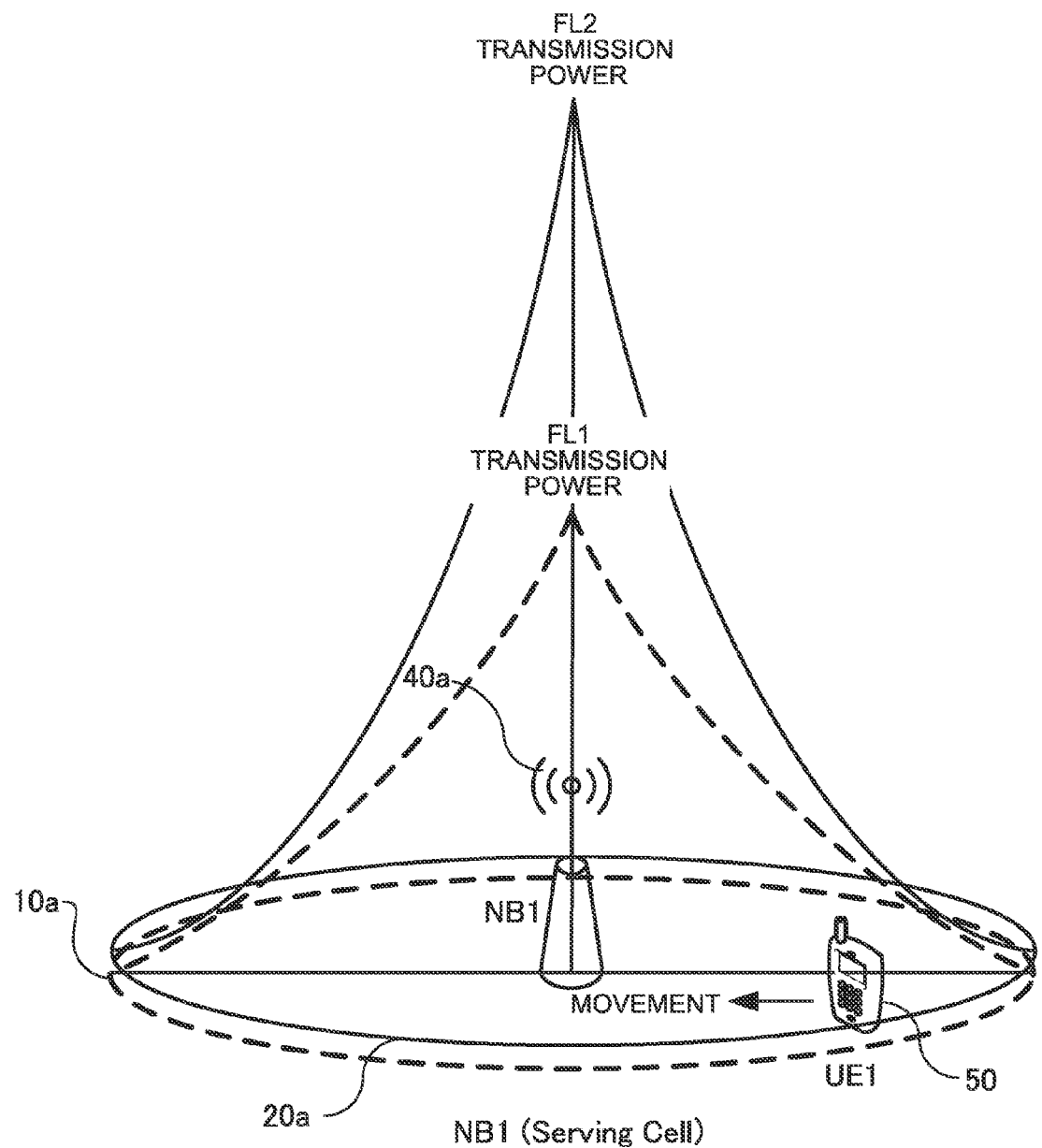
FIG. 14 illustrates a status of a cell area covered by a base station apparatus.

(F) Second Allocation Method of a Downlink Cell Dedicated Control Channel and a Downlink Cell Dedicated Traffic Channel According to the Present Embodiment FIG. 14 illustrates the status of a cell area covered by the base station apparatus 40$a$. Since radio propagation loss in FL2 is larger than that in FL1, the cover area 20$a$ of FL2 is identical to the cover area 10$a$ of FL1 if the base station apparatus 40$a$ compensates for the radio propagation loss by increasing transmission power in FL2.

Similarly to the first allocation method, the mobile station apparatus 50 enters, after power-on and following the reception of FL1_SCH of FL1 and the location registration procedure, the RCC IDLE Mode in the cover area 10$a$ of FL1 of the base station apparatus 40$a$. In the RCC CONNECTED Mode, the mobile station apparatus measures the numerical value indicating the downlink channel status by FL1_RS and FL2_RS of each base station apparatus. The measurement result is reported to the base station apparatus (Serving Cell) 40$a$ via FL1_PUCCH as an HO Request or a Measurement Report, either periodically or non-periodically.

FIG. 15 is a flow chart illustrating a procedure of assigning a downlink cell dedicated control channel DCDCCH and a downlink cell dedicated traffic channel DCDTCH of the base station apparatus to a low-frequency layer and/or a high-frequency layer. Specifically, an HO Request or a Measurement Report from the mobile station apparatus is received, and the mapping method of DTCH and DCCH is changed according to the communication requirement parameters. Since the allocation method for the second, third and fourth communication requirements is identical to the first allocation method, it is omitted. In the case of the first communication requirement, the user data (DTCH) and the dedicated upper layer control data (DCCH) are mapped onto FL1_PDSCH (S47). Similarly, after the method of mapping the user data (DTCH) and the dedicated upper layer control data (DCCH) onto FL1_PDSCH and/or FL2_PDSCH has been determined (S47, S49, S50 and S51), an HO Command for assigning a radio channel to the mobile station apparatus is transmitted to the mobile station.

The invention claimed is:

1. A communication method in a base station apparatus that is configured to perform radio communication with a plurality of mobile station apparatuses using a plurality of frequency layers having frequency bands different each other, the communication method comprising:

determining a communication condition of each of said mobile station apparatuses; said communication condition includes at least a downlink channel status numerical value;

transmitting downlink cell common control data on a low-frequency layer, transmitting downlink cell dedicated traffic data corresponding to each of said mobile station to a low-frequency layer and/or a high-frequency layer on the basis of said communication condition as a result of said determination of the communication condition of each of said mobile station apparatuses;

comparing said downlink channel status numerical value with a predetermined threshold value; and transmitting downlink cell dedicated traffic data on said low-frequency layer based on said result of said determination being that if said downlink channel status numerical value is smaller than said predetermined threshold value.

2. The communication method according to claim 1, further comprising: transmitting said downlink cell dedicated traffic data on said high-frequency layer based on said result of said determination being that a communication requirement is equal to or higher than a second communication requirement, wherein said communication requirement is included in said communication condition.

3. The communication method according to claim 1, further comprising: assigning said downlink cell dedicated traffic data to said low-frequency layer and said high-frequency layer based on said result of said determination being that a communication requirement is equal to or higher than a third communication requirement, wherein said communication requirement is included in said communication condition.

4. The communication method according to claim 1, further comprising: transmitting said downlink cell dedicated traffic data to said high-frequency layer based on said result of said determination being that if said downlink channel status numerical value is larger than a predetermined threshold value and if a communication requirement is equal to or higher than a second communication requirement, wherein said communication requirement is included in said communication condition.

5. The communication method according to claim 1, further comprising: transmitting said downlink cell dedicated traffic data to said low-frequency layer and said high-frequency layer based on said result of said determination being that if said downlink channel status numerical value is larger than a predetermined threshold value and if a communication requirement is equal to or higher than a third communication requirement, wherein said communication requirement is included in said communication condition.

6. A base station apparatus configured to perform radio communication with a plurality of mobile station apparatuses using a plurality of frequency layers having frequency bands different each other, said base station apparatus comprising:
   a determination unit is configured to determine a communication condition of each of said mobile station apparatuses, said communication condition includes at least a downlink channel status numerical value;
   a mapping unit is configured to assign downlink cell common control data to a low-frequency layer and assign downlink cell dedicated traffic data corresponding to each of said mobile station apparatuses to a low-frequency layer and/or a high-frequency layer on the basis of said communication condition as a result of said determination of the communication condition of each of said mobile station apparatuses;
   a control unit is configured to compare said downlink channel status numerical value with a predetermined threshold value; and
   a mapping unit is configured to assign said downlink cell dedicated traffic data to said low-frequency layer based on said result of said determination being that if said downlink channel status numerical value is smaller than said predetermined threshold value, wherein at least one of said determination unit which is configured to determine the communication condition, said mapping unit which is configured to assign said downlink cell common control data, said control unit which is configured to compare said downlink channel status numerical value, and said mapping unit which is configured to assign said downlink cell dedicated traffic data is included in the base station apparatus.

7. The base station apparatus according to claim 6, wherein said mapping unit is further configured to assign the downlink cell dedicated traffic data corresponding to each of said mobile station apparatuses to frequency layer based on a result of said determination being that said communication requirement is equal to or higher than a second communication requirement, wherein said communication requirement is included in said communication condition.

8. The base station apparatus according to claim 6, wherein said mapping unit is further configured to assign said downlink cell dedicated traffic data corresponding to each of said mobile station apparatuses to a low-frequency layer and a high-frequency layer based on a result of said determination being that a communication requirement is equal to or higher than a third communication requirement, wherein said communication requirement is included in said communication condition.

9. The base station apparatus according to claim 6, further comprising:
   said mapping unit is further configured to assign said downlink cell dedicated traffic data to said high-frequency layer based on said result of said determination being that if said downlink channel status numerical value is larger than a predetermined threshold value and if a communication requirement is equal to or higher than a second communication requirement, wherein said communication requirement is included in said communication condition.

10. The base station apparatus according to claim 6, further comprising:
   said mapping unit is further configured to assign said downlink cell dedicated traffic data to said low-frequency layer and said high-frequency layer based on said result of said determination being that if said downlink channel status numerical value is larger than a predetermined threshold value and if a communication requirement is equal to or higher than a third communication requirement, wherein said communication requirement is included in said communication condition.

* * * * *